United States Patent [19]
Gopinath et al.

[11] Patent Number: 5,608,649
[45] Date of Patent: Mar. 4, 1997

[54] DIRECTLY PROGRAMMABLE NETWORKS

[76] Inventors: Bhaskarpillai Gopinath, 118 Redmont Rd., Watchung, Somerset County, N.J. 07060; David Kurshan, 1540-1 Ocean Ave., Sea Bright, Monmouth County, N.J. 07760

[21] Appl. No.: 243,581

[22] Filed: May 16, 1994

[51] Int. Cl.$^6$ .................................................. H04Q 3/495
[52] U.S. Cl. ................ 364/514 C; 370/258; 340/825.02; 340/226; 340/827
[58] Field of Search .......................... 364/514 C; 370/53, 370/54, 94.3, 94.1; 340/825.02, 826, 827

[56] References Cited

U.S. PATENT DOCUMENTS

| | | | |
|---|---|---|---|
| 4,864,559 | 9/1989 | Perlman | 370/60 |
| 5,079,767 | 1/1992 | Perlman | 370/94.3 |
| 5,150,360 | 9/1992 | Perlman et al. | 370/94.3 |
| 5,245,609 | 9/1993 | Ofek et al. | 370/94.3 |
| 5,280,480 | 1/1994 | Pitt et al. | 370/85.13 |
| 5,425,021 | 6/1995 | Derby et al. | 370/54 |
| 5,459,725 | 10/1995 | Bodner et al. | 370/60 |
| 5,483,522 | 1/1996 | Derby et al. | 370/54 |

OTHER PUBLICATIONS

IEEE Std. 802.1D–1990, "IEEE Standards for Local and Metropolitan Area Networks", IEEE Standards Board, pp. 49–109. Mar. 8, 1991.

*Primary Examiner*—Emanuel T. Voeltz
*Assistant Examiner*—Patrick J. Assouad
*Attorney, Agent, or Firm*—John T. Peoples

[57] ABSTRACT

A procedure for establishing a scalable spanning tree over a network composed of nodes and links in which the resources for each node is independent of the size of the network. The procedure involves the selection of a set of states, a set of messages, state transition rules as well as a completion rule to thereby detect the the setting up of the spanning tree. One established, data may be distributed over the spanning tree so that coordination of data is maintained over all the nodes in the network.

8 Claims, 35 Drawing Sheets

| Time | Node 1 State | R | Link Role | Link Mode | MSG-O FO | MSG-O R | MSG-I FI | MSG-I R | CS1 | Clock CS2 | Clock P | Local Msg |
|---|---|---|---|---|---|---|---|---|---|---|---|---|
| 0 | | | | | | | | | | | 0 | |
| 1 | CHARGED | 1 | guard | charge | | | | | Rax Trg | Inh | 0 | Trg |
| 2 | FORCED | 1 | guard | force | force | 1 | | | | Inh | 0 | |
| 3 | | 1 | | | | | | | | | 0 | |
| 4 | | 1 | | | | | | | | | 0 | |
| 5 | | 1 | | | | | | | | | 0 | |
| 6 | | 1 | | | | | | | | | 0 | |
| 7 | | 1 | | | | | | | | | 0 | |
| 8 | | 2 | captain | force | | | force | 2 | | | 0 | |
| 9 | | 2 | | | | | | | | | 0 | |
| 10 | | 2 | | | | | | | | | 0 | |
| 11 | | 2 | | | | | | | | | 0 | |
| 12 | | 2 | | | | | force | 2 | | | 0 | |
| 13 | | 2 | | | | | | | | | 0 | |
| 14 | | 2 | | | | | | | | | 0 | |
| 15 | SNAPPED | 2 | captain | snap | snap | 2 | | | Trg | Rel | 0 | Rel |
| 16 | | 2 | | | | | | | | | 0 | |
| 17 | | 2 | | | | | | | | | 0 | |
| 18 | | 2 | | | | | | | | | 0 | |
| 19 | | 2 | | | | | | | | | 0 | |
| 20 | | 2 | | | | | | | | | 0 | |

FIG. 3A

| FIG. 3A |
|---|
| FIG. 3B |

FIG. 3

| Time | Node 1 | | Link | | MSG-O | | MSG-I | | Clock | | | Local Msg |
|---|---|---|---|---|---|---|---|---|---|---|---|---|
| | State | R | Role | Mode | FO | R | FI | R | CS1 | CS2 | P | |
| 21 | | 2 | | | | | | | | | 0 | |
| 22 | | 2 | | | | | | | | | 0 | |
| 23 | | 2 | | | | | | | | | 0 | |
| 24 | | 2 | | | | | | | | | 0 | |
| 25 | | 2 | | | | | | | | | 0 | |
| 26 | | 2 | | | | | | | | | 0 | |
| 27 | | 2 | | | | | discharge | 2 | | | 0 | |
| 28 | DISCHARGED | 2 | captain | discharge | | | | | | | 0 | |
| 29 | CHARGED | 1 | guard | charge | charge | 2 | | | | | 0 | |
| 30 | | 1 | | | | | | | | | 1 | |
| 31 | | 1 | | | | | | | | | 1 | |
| 32 | | 1 | | | | | | | Rax | Inh | 1 | |
| 33 | | 1 | | | | | | | | | 1 | |
| 34 | | 1 | | | | | | | | | 1 | |
| 35 | | 1 | | | | | | | | | 1 | |
| 36 | | 1 | | | | | | | | | 1 | |
| 37 | | 1 | | | | | | | | | 1 | |
| 38 | | 1 | | | | | | | | | 1 | |
| 39 | | 1 | | | | | | | | | 1 | |
| 40 | | 1 | | | | | | | | | 1 | |

FIG. 3B

| Time | Node 1 | | Link | | MSG-O | | MSG-I | | Clock | | | Local |
|---|---|---|---|---|---|---|---|---|---|---|---|---|
| | State | R | Role | Mode | FO | R | FI | R | CS1 | CS2 | P | Msg |
| 0 | CHARGED | 2 | guard | charge | | | | | Rax | Inh | 0 | |
| 1 | CHARGED | 2 | guard | charge | | | | | Trg | Inh | 0 | Trg |
| 2 | FORCED | 2 | guard | force | force | 2 | | | Trg | Inh | 0 | |
| 3 | | 2 | | | | | | | | | 0 | |
| 4 | | 2 | | | | | | | | | 0 | |
| 5 | | 2 | | | | | | | | | 0 | |
| 6 | | 2 | | | | | force | 1 | | | 0 | |
| 7 | | 2 | | | force | 2 | | | | | 0 | |
| 8 | | 2 | | | | | | | | | 0 | |
| 9 | | 2 | | | | | | | | | 0 | |
| 10 | | 2 | | | | | | | | | 0 | |
| 11 | | 2 | | | | | | | | | 0 | |
| 12 | | 2 | | | | | | | | | 0 | |
| 13 | | 2 | | | | | | | | | 0 | |
| 14 | | 2 | | | | | | | | | 0 | |
| 15 | | 2 | | | | | | | | | 0 | |
| 16 | | 2 | | | | | | | Trg | Rel | 0 | Rel |
| 17 | | 2 | | | | | | | | | 0 | |
| 18 | | 2 | | | | | | | | | 0 | |
| 19 | | 2 | | | | | | | | | 0 | |
| 20 | | 2 | | | | | | | | | 0 | |

FIG. 4A

| FIG. 4A |
|---|
| FIG. 4B |

FIG. 4

| Time | Node 1 | | Link | | MSG-O | | MSG-I | | Clock | | | Local |
|---|---|---|---|---|---|---|---|---|---|---|---|---|
| | State | R | Role | Mode | FO | R | FI | R | CS1 | CS2 | P | Msg |
| 21 | | 2 | | | | | | | | | 0 | |
| 22 | FORCED | 2 | guard | snap | | | snap | 2 | | | 0 | |
| 23 | SNAPPED | 2 | guard | snap | discharge | 2 | | | | | 0 | |
| 24 | DISCHARGED | 2 | guard | discharge | | | | | | | 0 | |
| 25 | | 2 | | | | | | | | | 0 | |
| 26 | | 2 | | | | | | | | | 0 | |
| 27 | | 2 | | | | | | | | | 0 | |
| 28 | | 2 | | | | | | | | | 0 | |
| 29 | | 2 | | | | | | | | | 0 | |
| 30 | | 2 | | | | | | | | | 0 | |
| 31 | | 2 | | | | | | | | | 0 | |
| 32 | | 2 | | | | | | | | | 0 | |
| 33 | | 2 | | | | | | | | | 0 | |
| 34 | | 2 | | | | | | | | | 0 | |
| 35 | | 2 | | | | | charge | 2 | | | 0 | |
| 36 | CHARGED | 2 | guard | charge | | | | | | | 0 | |
| 37 | | 2 | | | | | | | | | 0 | |
| 38 | | 2 | | | | | | | | | 0 | |
| 39 | | 2 | | | | | | | Rax | Inh | 1 | |
| 40 | | 2 | | | | | | | | | 1 | |

FIG. 4B

DIRECTLY PROGRAMMABLE NETWORKS

FIELD OF THE INVENTION

This invention relates generally to implementing distributed programs and services in a network of autonomous computers and, more specifically, to a methodology for democratically synchronizing and distributing state changes as well as concomitant data from the autonomous computers.

COPYRIGHT NOTICE

A portion of the disclosure of the patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF THE INVENTION

A distributed program is one in which elements of the program execute simultaneously on multiple processors. Examples of distributed programs include network services such as: simple two-party telephone calls, or conference telephone calls; shared network file systems; and Local Area Network operating systems.

Inherent in a distributed program is the problem of providing data distribution and synchronization among processors. The current approach to distributing data in a network is via messages. These messages are packetized by the application processes and distributed using complex protocol stacks such as TCP/IP or OSI. These protocols provide reliable distribution of packets and network session management. Elements of distributed programs communicate with another program via multiple point-to-point sessions which are established through the network.

The difficult problem of coordinating the asynchronous processes which comprise the distributed program is left to the application. Typically, this coordination involves a set of processors in a "wait" state because the processors have reached an "abstraction barrier", that is, a point at which certain processors cannot continue until other processors in the system reach a comparable point—at which point (in time) the processors share some data. At this point, the processors must all agree by exchanging messages that the processors all have the same values for the same set of data. The processors can proceed independently until another abstraction barrier is reached, whereupon the message interchange must again be effected. Implementing this coordination is a complex and error-prone task. For example, each processor must keep track of which other processors in the network must agree before any given abstraction barrier can be passed. This is exceedingly difficult in practice since where each process actually executes is dynamically allocated based on available total system resources. System recovery in the event of a failure of one or more elements in the network is particularly difficult. Recovery is usually triggered by timeouts which occur asynchronously in different parts of the network. In order for the system to function reliably, these timeouts must be sensitive to propagation delays in the network.

In a network of processors where multiple distributed applications are executing simultaneously, isolating problems resulting from inadvertent interference between applications comprises the most difficult and time consuming part of system testing and debugging. In single processor environments, this problem has been solved by memory protection schemes. With such schemes, virtual memory space is partitioned by the operating system and assigned to processes running within the system. If a process makes an illegal memory reference (i.e. to an address outside its assigned space), the event is detected by the hardware and trapped. A process of a distributed application, however, must reference objects outside its own memory space since its must be able to communicate with other parts of the system. Because there is no protection for this type of shared space, inadvertent accesses outside its own memory space go undetected, resulting in eventual unpredictable behavior of the system.

The underlying network itself is responsible for the actual delivery of the data packets. At its simplest level, the network may be a single wire such as an Ethernet, on which all messages are broadcast to each computer in the network. As demand grows, however, a single wire can no longer carry all the traffic, and the network becomes a set of local area networks interconnected by switching elements which direct franc between the local networks as necessary. When this happens, the operation and management of the network increases in complexity. In very large networks such as the public switched telephone network, hundreds or even thousands of these switching elements are required. In these switch networks, message routing and provision of adequate reliability in the event of hardware or software failures is an extremely complex problem. Oftentimes, such a network is described as one that does not scale gracefully. Scalability means that information required for processing is finite at each processor and is independent of the size of the network.

SUMMARY OF THE INVENTION

These deficiencies as well as other shortcomings and limitations are obviated, in accordance with the present invention, by a methodology and concomitant system arrangement so as to: (i) greatly reduce the effort required to design, program, test, and deploy distributed applications; and (ii) allow the creation of networks which can economically grow from small to very large size without appreciable increase in the complexity of routing and management.

Broadly, in accordance with one method aspect of the present invention, a scalable spanning tree is established for an arbitrary subset of nodes and links in a network in which the total resources at each node is independent of the size of the network. In determining this scalable spanning tree, first a set of states is selected for each node and each link in the network, the set of states being independent of the topology of the network, of the size of the network, and of the node itself. Next, a set of messages is selected to be exchanged between neighboring nodes over the links, the set of messages also being independent of the topology of the network, of the size of the network, and of the node itself. Then, state transition rules are determined for the state of each node and of each link to coordinate the sending and receiving of the messages to the neighboring nodes for setting up the spanning tree, the state transition rules also being independent of the topology of the network, of the size of the network, and of the node itself. Finally, a completion rule is determined in order that at least one node detects the formation of the spanning tree, the rule also being independent of the topology of the network, of the size of the network, and of the node itself.

In the network of processors operating in accordance with the methodology of the present invention, distribution, coordination, and protection are interlocked so that all data transfers are synchronized to some discrete instant of time and are protected from inadvertent reading and updating by the system. The methodology utilizes the logical construct of a "harmonic clock". (A harmonic clock may also be referred to as an interface cycle. The details of an interface cycle have been disclosed in a U.S. patent application Ser. No. 08/021,096 filed Feb. 23, 1993, and having the same inventors as the present invention; this identified patent application is incorporated by reference herein). Each harmonic clock is a counter which can be used to represent an abstraction barrier. Participating processes, that is, those processes which are relevant to a particular abstraction barrier and which have the appropriate authorization key, can read the value of the harmonic clock associated with the abstraction barrier. In addition to reading the value of the harmonic clock, each processor can perform other operations on the harmonic clock; exemplary operations are "inhibit", "trigger", and "release". When a processor inhibits a harmonic clock, it is, in effect, freezing the value of the harmonic clock. When a processor releases a harmonic clock, it is removing any inhibits which the processor had previously placed on the harmonic clock. When a processor triggers a harmonic clock, it is indicating to the network of processors that the harmonic clock should be advanced as soon as there are no other inhibits registered against the harmonic clock. In addition, when a processor triggers a harmonic clock, the processor can pass along with the trigger some arbitrary data to the network, that is, to participating processors.

The methodology embedded in the network of processors keeps track of the status of each harmonic clock. When any harmonic clock has had at least one trigger, the network methodology will advance the clock as soon as there are no inhibits against the harmonic clock. When this occurs, (a) the clock is incremented (advanced), and (b) the network allows each participating processor to advance in lock-step with the given harmonic clock. This advance includes the new value of the counter, that is, the harmonic clock, and all the data that any participating processors had included with their triggers. To the participating processors, this event signifies that an abstraction barrier has been passed.

The methodology changes the paradigm for programming distributed systems. Processors no longer need to keep track of a dynamically changing set of participating processors at any abstraction barrier. The processors simply participate in the harmonic clock for each abstraction barrier of relevance. Because all data distribution is synchronized to the advance of a harmonic clock, all processors know that all other processors have identical values of data distributed with respect to a particular harmonic clock along with the same value of the harmonic clock. This synchronization permits distributed programs to proceed as a set of logical steps on multiple processors, only proceeding to the next step after agreement by those processors having a need to coordinate. In the event of failures, recovery is initiated with respect to the value of the harmonic clock, rather than with respect to the conventional technique of referencing physical timers, thereby insuring that all participating processors are working with identical data and state information. Because data is never discarded by the network, conventional protocol software is not required. Data is simply transferred as logical variables, with read and update authorizations of those variables being enforced by the methodology. At the applications interface, the entire network appears as memory, and coordinated data transfers become nothing more than simple memory reads and writes.

The methodology specifies a network implementation of harmonic clocks which guarantees that the value of the counter associated with each harmonic clock does not vary by more than one increment at all places in the network at any instant of time. In addition, the methodology ensures an efficient, fully distributed procedure for multicasting harmonic clock status and data through the network.

One important feature of this methodology is a unique flow control mechanism based on harmonic clocks which manages data flow through the network having the following properties: (1) flow control is applied on a virtual circuit basis; and (2) data is never discarded by the network because the links of the network, that is, the interconnection paths between processors geographically dispersed in the network, are used as buffers in which data is circulating until the data can be delivered.

Another significant feature is that the network of harmonic clocks can scale—increase in size—very gracefully because it has the following properties:

(a) the number of messages per virtual circuit per node does not increase as the number of nodes in the network grows;

(b) the amount of buffer space needed at any node is independent of both the number of virtual circuits and the number of nodes, that is, the number of processors in the network;

(c) multiple links between the same nodes are supported, with no change to the network control mechanism;

(d) each node is aware of its neighbors (those nodes with which a node shares a link). There is no single place (or set of places) where the entire network topology must be known to route connections or otherwise manage the network; and (e) the entire network is self timed implying that the logical consistency of any distributed application is totally independent of it performance.

The organization and operation of this invention will be understood from a consideration of the detailed description of the illustrative embodiment, which follows, when taken in conjunction with the accompanying drawing.

BRIEF DESCRIPTION OF THE DRAWING

FIG. 3 depicts the node, link, message, and clock states for a complete synchronized agreement cycle for the first node in a two-node, one-link network;

FIG. 4 depicts the node, link, message, and clock states for a complete synchronized agreement cycle for the second node in a two-node, one-link network;

DETAILED DESCRIPTION

To place in perspective the detailed description of the present invention, it is instructive to first gain a basic understanding of the network-of-computers environment in which the present invention operates. This approach has the advantage of introducing notation and terminology which will aid in elucidating the various detailed aspects of the present invention. Thus, the first part of the description focuses on a high-level discussion of the network environment pertinent to the inventive subject matter. After this, the second part of the description focuses on illustrative examples which further elucidate aspects of this invention which will aid in understanding the broadest aspects of the present invention. Next, the third part of the description covers the most general exposition of the present invention by way of presentation of pseudo-code for the network transition messages. Finally, the fourth part of the description provides programming code in standard VHDL language for implementing the general exposition.

I. Overview

Figure 1:
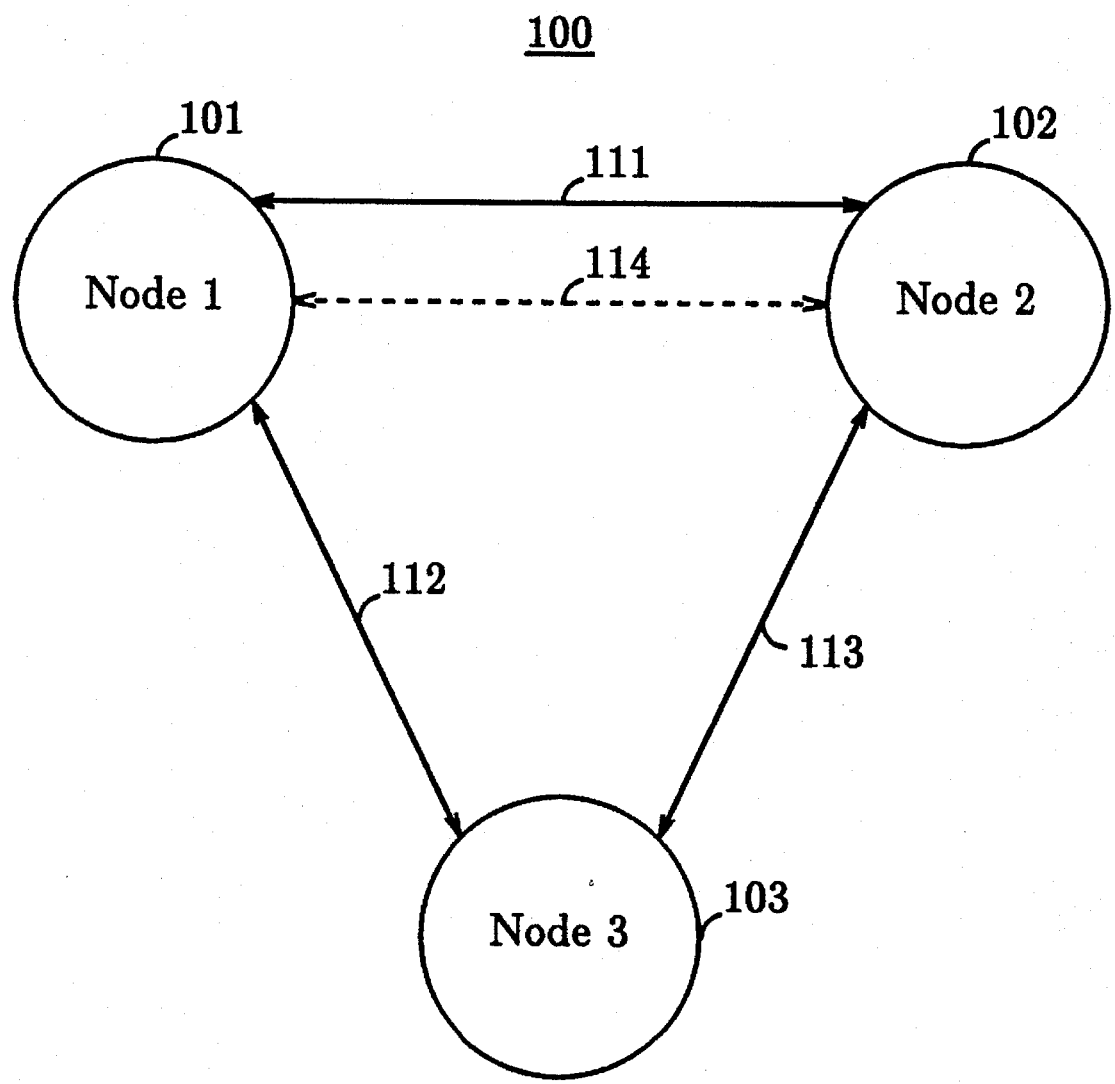
FIG. 1 illustrates a three-node, three-link network arranged in accordance with the present invention.

With reference to FIG. 1, there is shown network 100 in accordance with the present invention. Network 100 is generally composed of N "nodes"; for illustrative purposes, and without loss of generality, the case of N=3 is shown in FIG. 1, that is, network 100 comprises nodes 101, 102, 103. Node identifiers such as "101" are designated as physical descriptors since such descriptors identify the nodes in a topology that remains fixed. Nodes may also be referred to by logical descriptors. For instance, node 101 has logical descriptor "Node 1" shown internal to node 101, node 102 has descriptor Node 2, and so forth, and the numerical part of the logical descriptor (e.g., "1" in Node 1) refers to the "rank" of the node—with the largest numerical value identifying the highest rank. The rank of a node can change dynamically, as will be described below, whereas the physical identifier of a node (e.g., node 101) is fixed. Initially, the rank of each node corresponds to its physical descriptor in the network hierarchy. When reference is made to Node J or NJ, J is the physical descriptor.

The nodes of network 100 are interconnected with "links", such as link 111 connecting nodes 101 and 102, link 112 coupling nodes 101 and 103, and link 113 joining nodes 102 and 103. Links are bidirectional. Also, more than one link may join node pairs; for instance, link 114, shown as dashed, would also interconnect nodes 101 and 102. Network 100 is assumed to be "connected", that is, there is a path comprising one or more links from any given node to any other node. Links route the "messages" generated by the nodes; messages are discussed in more detail shortly. The "neighborhood" of a node I is the set of other nodes J for which links exist. For example, the neighborhood of node 101 is the set composed of nodes 102 and 103. Either node 102 or node 103 is referred to as a "neighbor" of node 101.

Each node is always in one of four states, namely: CHARGED, FORCED, SNAPPED, DISCHARGED. The meaning of these terms will be elucidated as the description proceeds.

Each end of each link may have associated with it a two-part link identifier; the first part of the link identifier is called the "role"; the role is one of the following: captain, guard, friend. The second part of the link identifier is called the "mode"; the mode is one of the following: charge, force, snap, discharge, resign. A link identifier has the form role.mode; examples of link identifiers include charge.guard; captain.snap; and guard.force. Not all combinations are possible, as will be evidenced as the discussion unfolds. Also, the meaning of the link identifier in the role.mode form will be elucidated as the description proceeds.

Messages are propagated over links. Each message is composed of a "field" and "rank". Messages are either transmitted by a node or received by a node. Since links are bilateral, messages can be simultaneously transmitted and received by a given node over each link. For either a transmitted or received message, the field identifiers are the same as the mode identifiers, namely, the field is one of the following: charge, force, snap, discharge, resign. For a message being assembled for transmission, the rank is the logical rank of the node at the instant the message is assembled. On the other hand, for a received message, the rank is already embedded in the message for identification.

A harmonic clock C provides a way to coordinate programs executing within the nodes, processors, or other entities associated with the nodes of network 100 (programs, processors, or entities are hereinafter referred to as "entities" as a shorthand notation) using a logical version of a synchronized agreement "cycle". A cycle is broadly defined at this point as the progression from a initial stage to one or more intermediate stages with eventual return to the initial stage; refinements to this definition will be effected as the discussion proceeds. A harmonic clock allows these entities to agree on the definition of the cycle in a distributed manner. When the entities are under control of the operating principles to be elucidated shortly, it is guaranteed that any cycle will not be completed until all entities have agreed to allow the cycle to complete. There may be many harmonic clocks simultaneously and independently active. Each clock has a count designated P. The upper limit on P is typically finite, so the count of any clock C is interpreted modulo Q, where Q is the upper limit.

At the initiation of each clock C, it is assumed that a network, such as exemplified by network 100, has been configured to distribute the given clock C to a set of nodes, such as nodes 101–103. This network is denoted by C_Net. The set of nodes of C_Net is denoted by C_N. The set of links in C_Net that impinge on node I is denoted by C_Nd(I). A clock C has associated with it a three-part identifier of the form "clock_state1,clock_state2,count", wherein clock_state1 is either relaxed or triggered, clock_state2 is either inhibited or released, and the count is the actual numerical value (P modulo Q) registered by clock C.

| Additional Terminology and Notation | |
|---|---|
| 1.) C.* | Messages "received" by a node regarding a clock C are denoted by prefixing the message with C.; for example, <C.rank> means the rank associated with the clock C embedded in a message received by a given node. |
| 2). L | The link over which a node receives a message. |
| 3). CONTINUE | The starting point in the message handling process. |
| 4). message=[force, <C.rank>] | Means "message.#[force.<C.rank>" |

Data Structures

Data structures are described as nested sets. An enumerated set is described by the list of its elements; for example: {a,b,c} is the set consisting of a, b, and c. A data structure x represented by x.{a,b,c} can have values a, b, or c. When a data structure has several components, a comma is used to separate elements; for example: [x,y] has two components. A nested structure is denoted using the nesting of [] and {}; for example: [x.{a,b,c},y.{d,e}] consists of two components x and y where x can take on the values a, b, or c and y can have values d or e. The modification of data structures by events are described by indicating the components that change. All other components are assumed to have the previous value. For example: set x.[3,4]=a only changes the values of x.3 and x.4 to a. Substitution of a label with the value of another is indicated by <>; for example: x.<y> denotes x.z if y=z. An * at a place in a data structure denotes all possible substitutions; for example: x.*.a denotes all elements of the array x that have the value a. Specific instances of a data structure that may take on several values are represented by denoting the values of components using =, or by showing values in place. For example, the data structure x.[y.{a,b,c},z.{d,e}] can have value x.[y=a,z=d] or, equivalently, x.[#a,#d] or x.#[a,d].

In terms of the data structure definitions, the form of a self message may be summarized as:

self.[{forced?,snapped?,discharged?}]

In terms of the data structure definitions, the form of a system message may be summarized as:

message.[{force,snap,resign,discharge,charge}, <rank>].

In the data structure notation defined above, the clock message for each node may be summarized as follows:

clock.[{relaxed,triggered},{inhibited,released}, <P mod Q>].

II. Illustrative Examples

A. Two Node, one Link case

Figure 2:
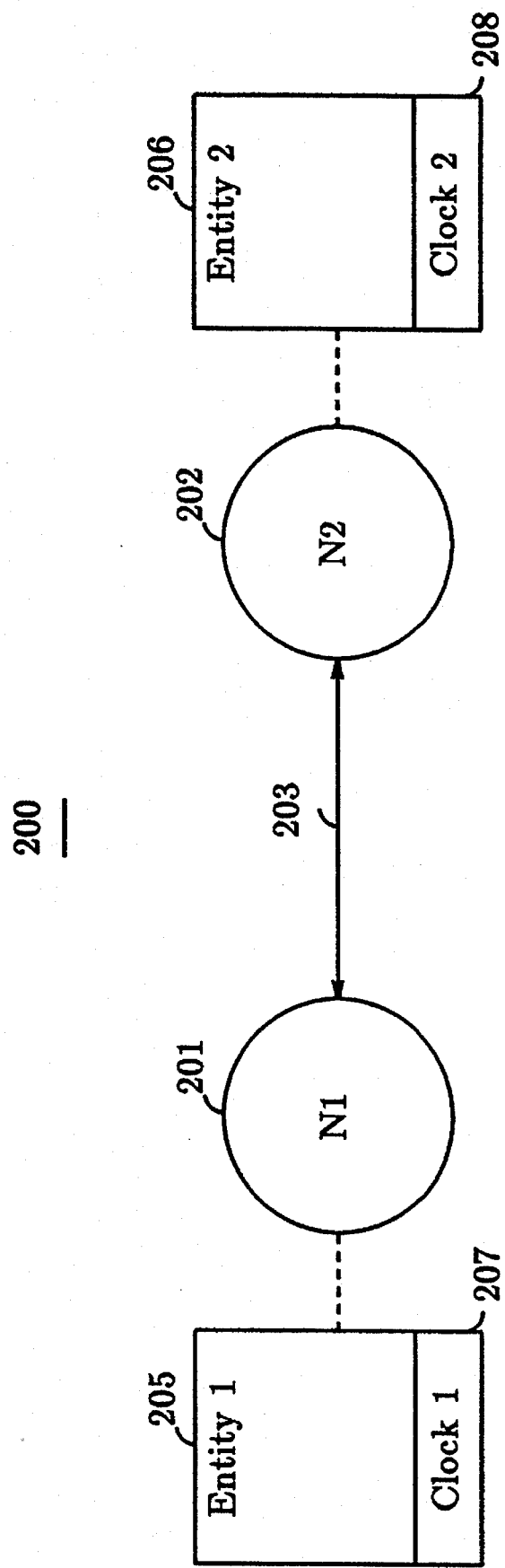
FIG. 2 illustrates a two-node, one-link network with associated entities arranged in accordance with the present invention.

With reference to FIG. 2, two nodes 201 and 202 (also designated nodes N1 and N2, respectively) are shown interconnected by single, bidirectional link 203. For purposes of discussing the illustrative example, nodes 201 and 202 both have the same status upon initialization, namely, each node state is CHARGED, and the rank of each node is its physical node identifier; for example, node 201 has rank=1, and node 202 has rank=2. The initial role and mode of link 203 are the same for both ends, namely, the role=guard and the mode= charge. Each node has a computing entity associated with the node, and in FIG. 2, entity 205 is shown as associated with node 201 wherein entity 206 is associated with node 202. Each entity may be, for example, an external computer system operating in cooperation with its associated node; as another example, each entity may be a microprocessor embedded in the associated node. In any case, each entity is presumed to operate under control of an autonomous clock, such as clock 207 associated with entity 205, or clock 208 associated with entity 206. Each clock is assumed to have initial "clock_state1" and "clock_state2" states of relaxed and inhibited, respectively. In addition, the initial "count" is assumed to be 0, that is, P=0.

By way of summarizing this information, the table of FIG. 3 depicts a time sequence in the vertical dimension of the unfolding of: (a) the states and rank of node 201 ("Node 1" in the top line of the table; which is subdivided into "State" and "R"); (b) the role.mode of the end of link 203 terminating on node 201 ("Link" in the top line of the table, which is subdivided into "Role" and "Mode"); and (c) the states and the phase of clock 207 ("Clock" in the top line of the table, which is subdivided into "CS1", "CS2", and "P"). The top line of the table of FIG. 3 also includes: (i) a column designated "Time", which, on a normalized basis, is incremented in single units; (ii) a column designated "MSG-O" for "message-out", which is subdivided into "FO" and "R", meaning "field-out" and "rank"; and (iii) "Local Msg" for "local message", which is the message (trigger or release) originated by the local entity 205. The row corresponding to "Time"=0 summarizes the initialization information as presented above. Moreover, as a data point to continue the discussion, it is presumed that a trigger message has been generated by local entity 205 at "Time"=0.

In the same manner just described for node 201, there is a corresponding table which summarizes information about node 202, link 203 terminating on node 202, entity 206, and clock 208, and this table is shown in FIG. 4 with the same layout as the table of FIG. 3

Figure 5:
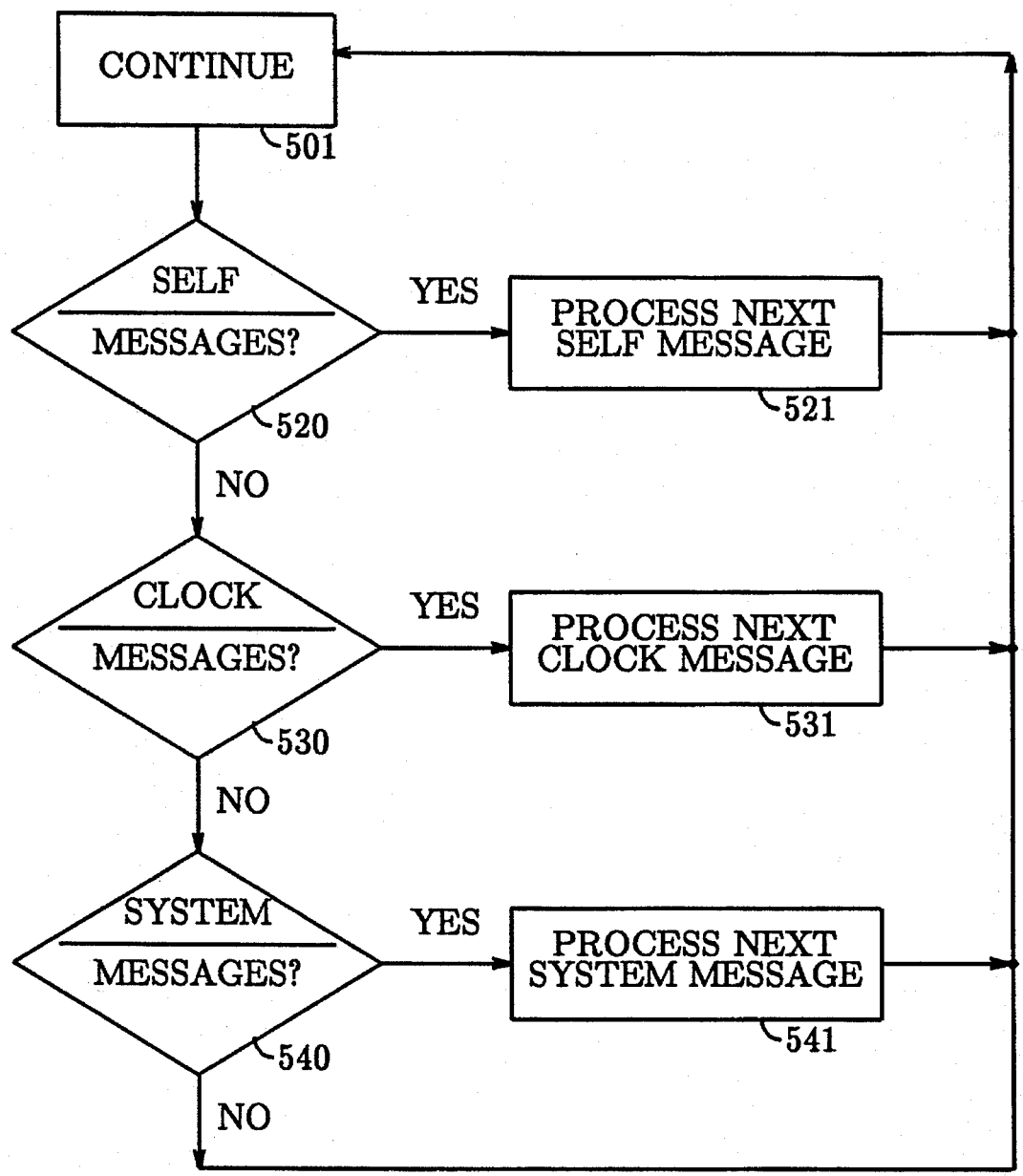
FIG. 5 depicts, in flow diagram form, the methodology for handling messages.
Figure 6:
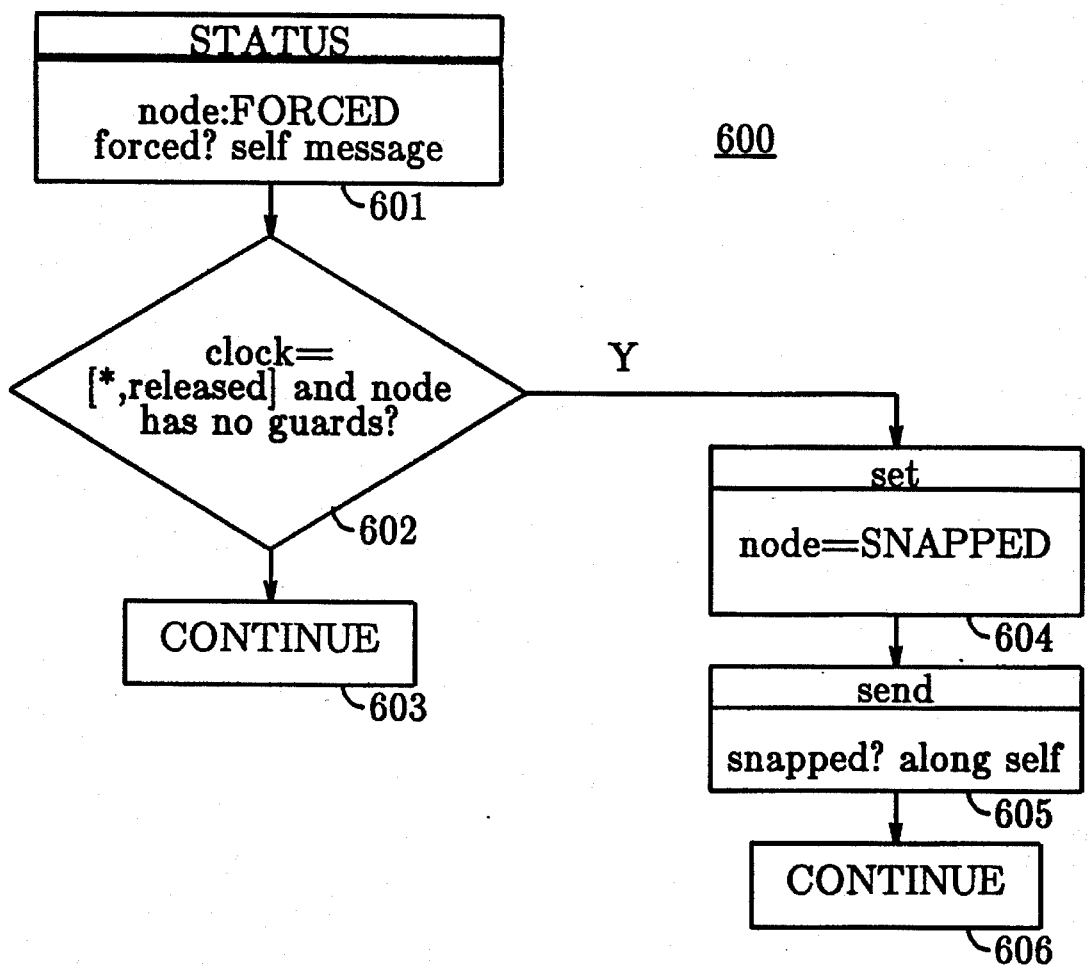
FIGS. 6–8 depict (self messages)
Figure 7:
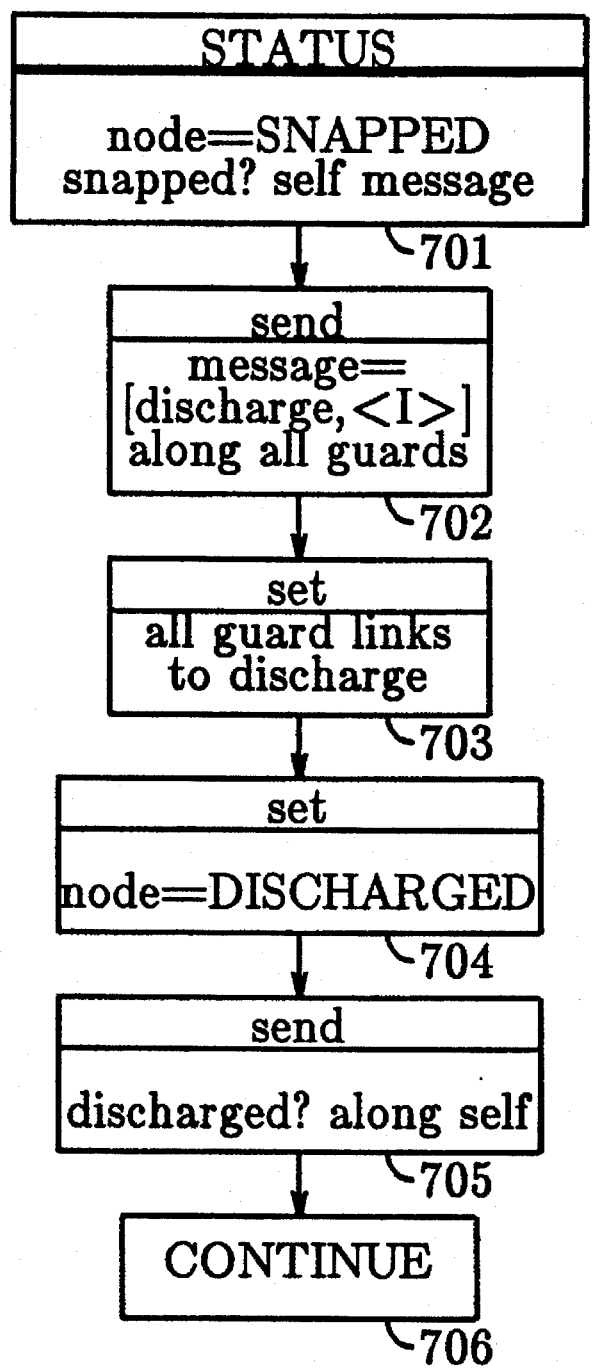
Figure 8:
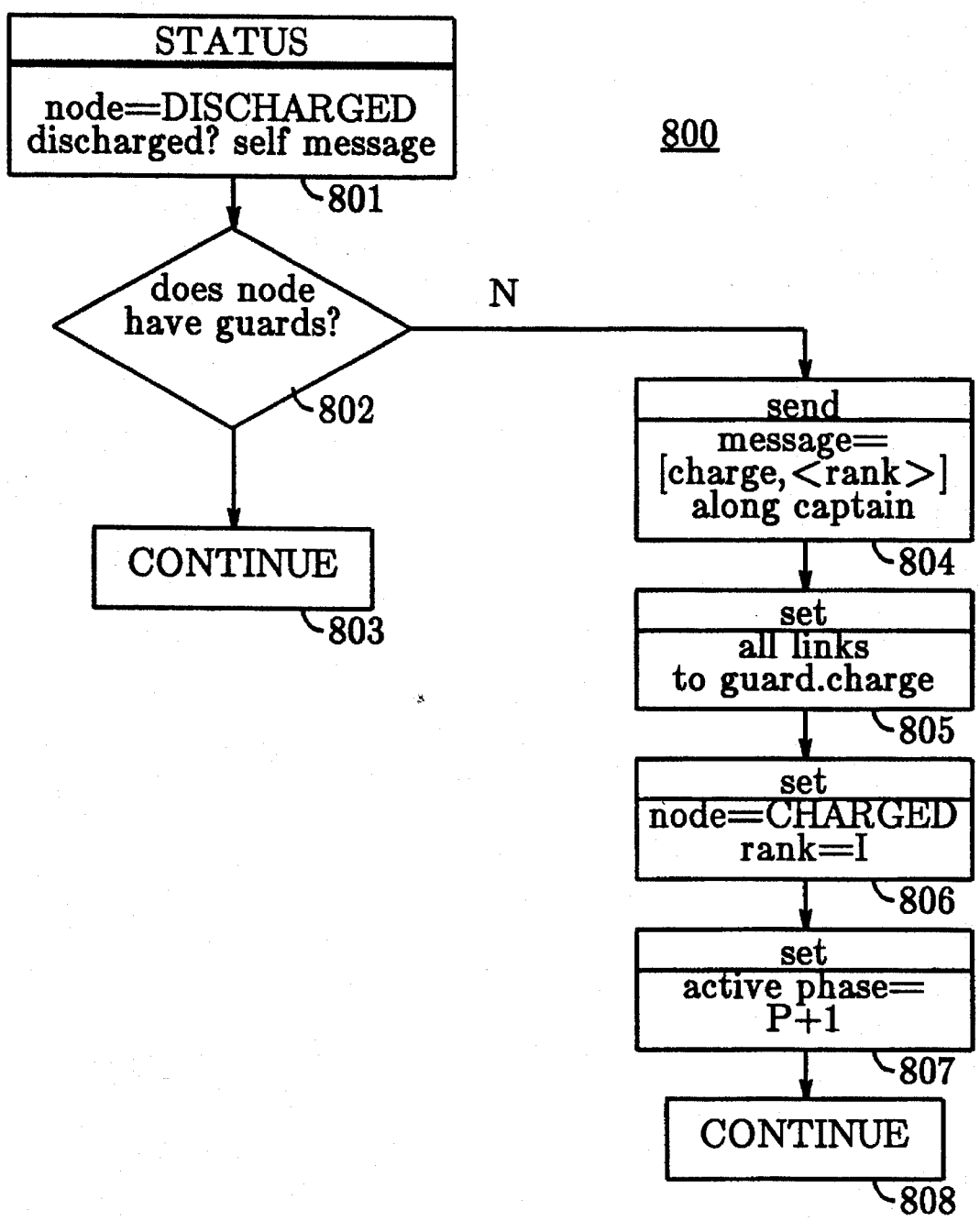
Figure 9:
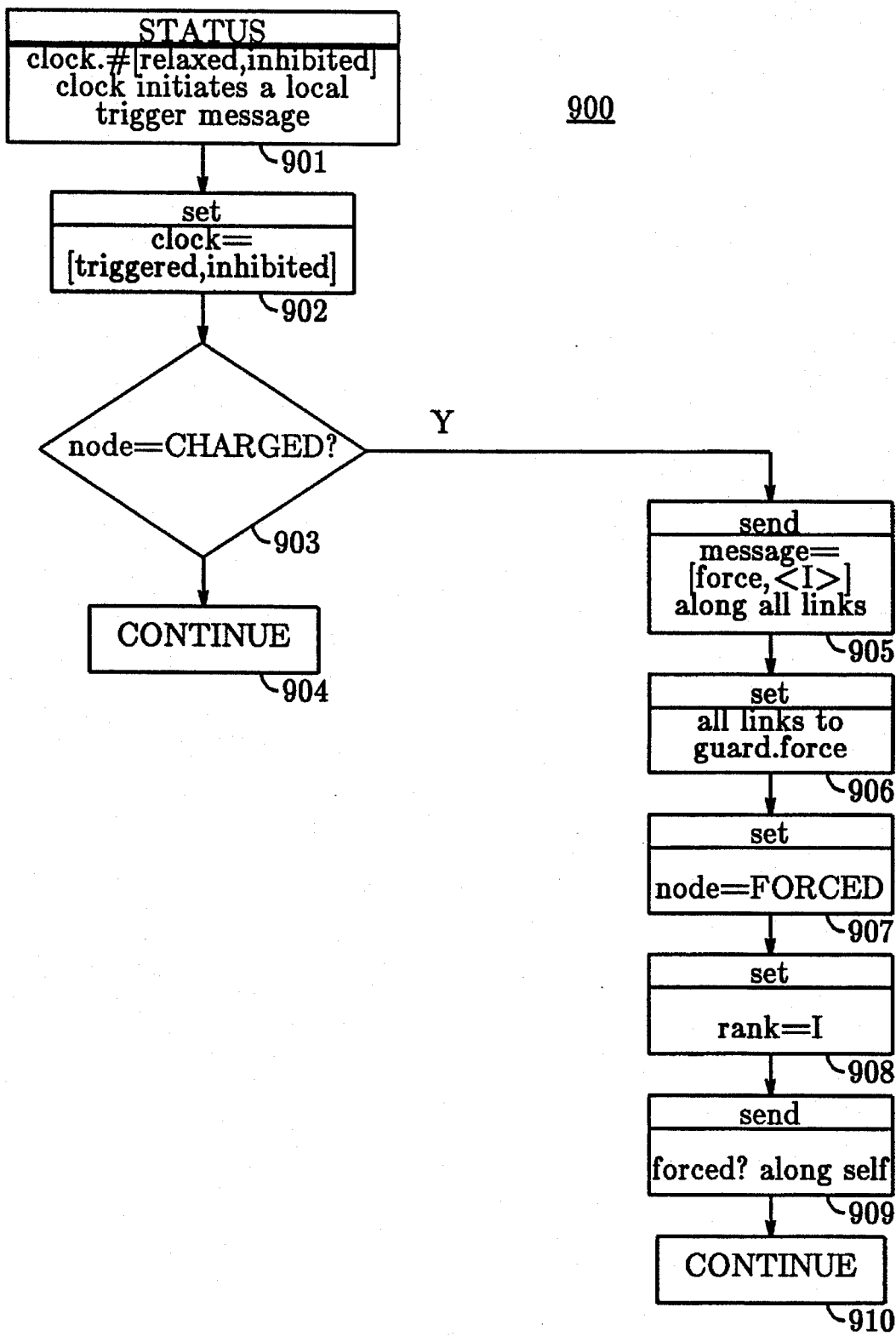
FIGS. 9–10 depict (clock messages)
Figure 10:
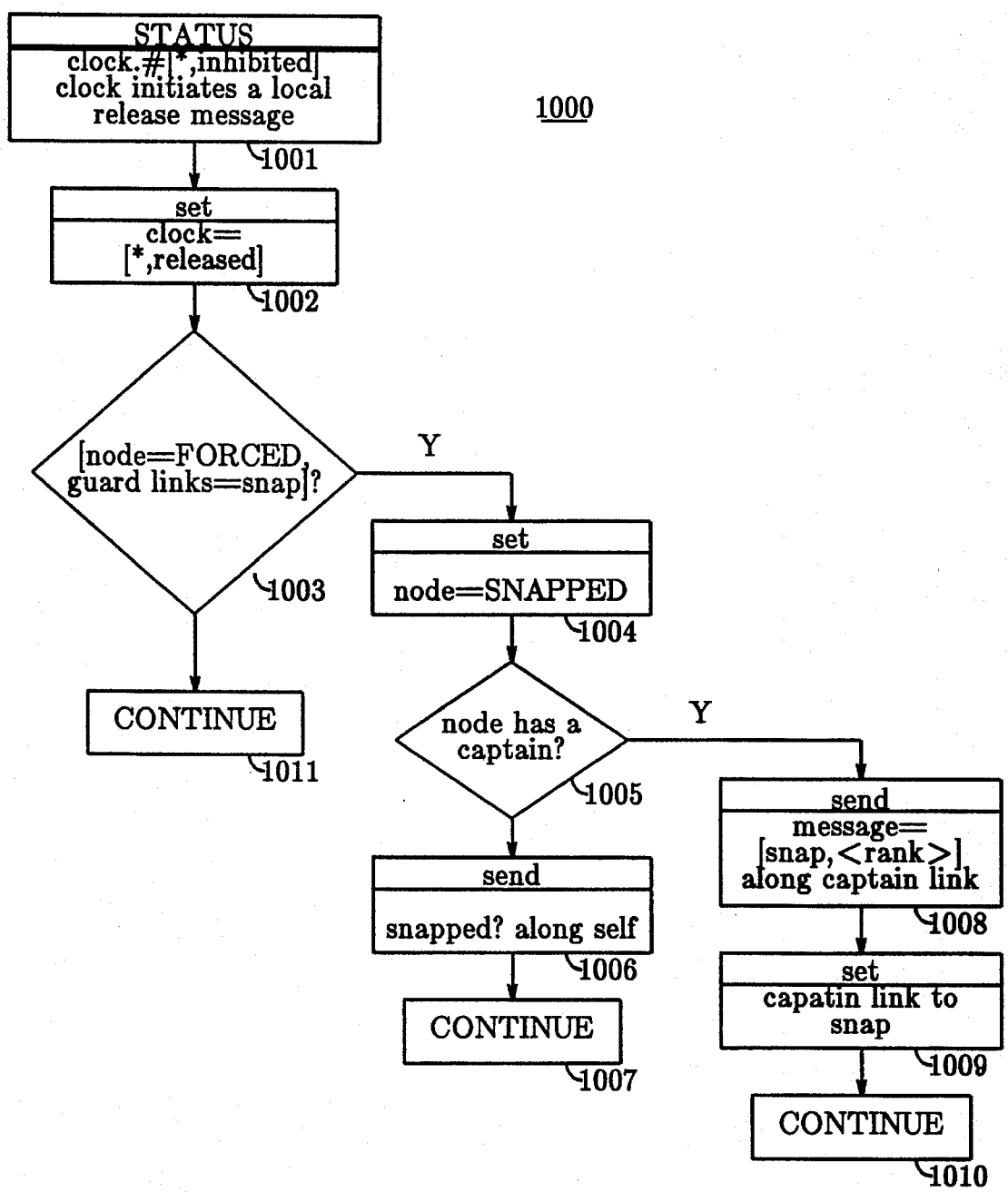
Figure 11:
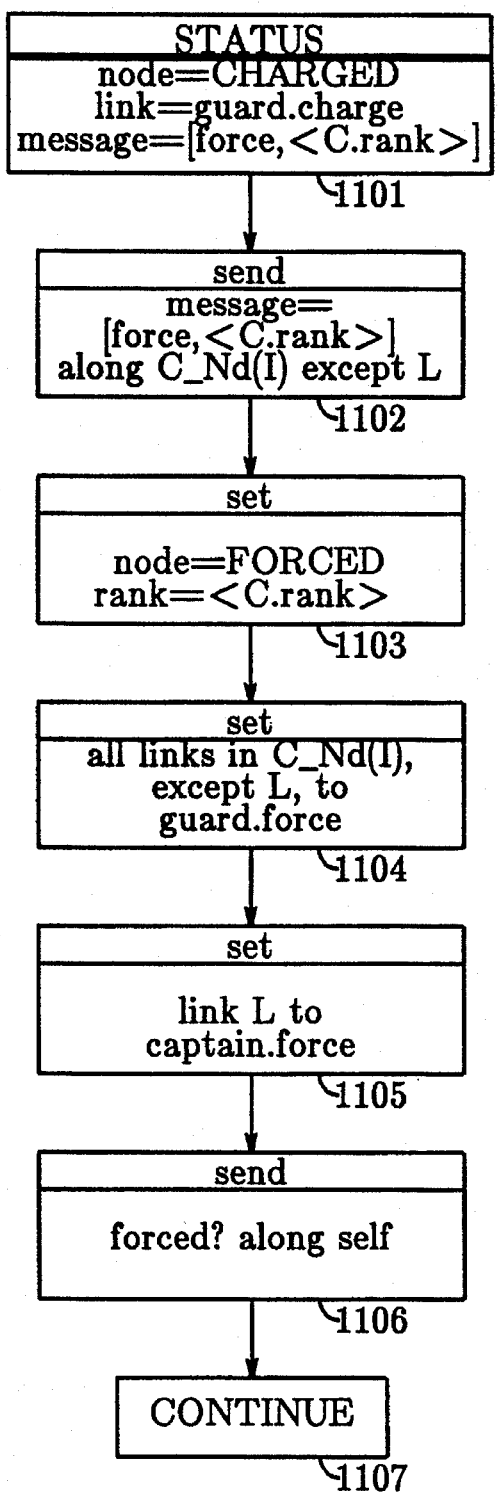
FIGS. 11–16 depict (system messages)

In order to clearly and concisely discuss the node states, role.mode of the link at each end, clock states, and so forth for a complete synchronized agreement cycle between nodes 201 and 202, it is most expeditious to introduce a set of flow diagrams, namely the diagrams shown in FIGS. 5–17, which elucidate the transitions occurring during the synchronized agreement cycle. Reference to the relevant flow diagram will be made when required. Each flow diagram in the set FIGS. 6–17 has a similar layout in that the first block represents a "STATUS" which must be conformed to in order to invoke the processing depicted by the remainder of the flow diagram. For example, FIG. 11 shows that the STATUS of the (a)node, (b)link, and (c) incoming message must be, respectively, CHARGED, guard.charge, and #[force, <C.rank>]. FIG. 5 is special in that it depicts the message handling technique for self messages, clock messages, and system messages, as discussed in detail below. As depicted in FIG. 5, self messages are messages directed to the node giving rise to the message, and self messages as handled as illustrated in FIGS. 6, 7, and 8. Clock messages are the messages produced by each clock to establish a synchronized cycle, and clock messages are handled as illustrated in FIGS. 9 and 10. System messages are transmitted over links from originating nodes, and system messages are handled as illustrated in FIGS. 11–16.

The objective of selecting: these states for the nodes and links; selecting the self, clock, and system messages (so-called set-up messages); and rules for transitioning among the states, is to establish a scalable spanning tree in such a way that at least one node detects the formation of the spanning tree as the states, messages, and rules unfold. In this disclosure, the establishment of a spanning tree can be broadly stated to mean the dynamic determination of a subset of the topology of the network that is loop-free (a tree) and yet has sufficient connectivity so that, where possible, there is a path between every pair of nodes (the tree then becomes a spanning tree).

Figure 17:
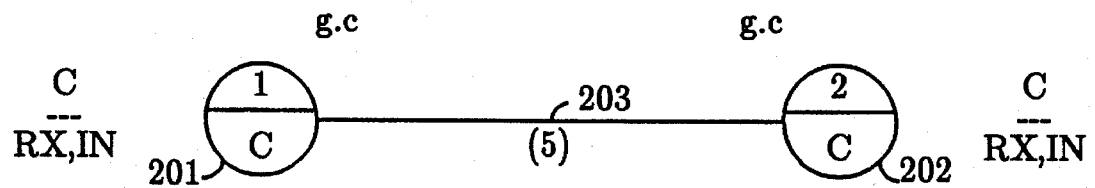
FIGS. 17–27 depict the state of the nodes and the link for the two-node, one-link example at various stages due to self messages, clock messages, and system messages.
Figure 18:
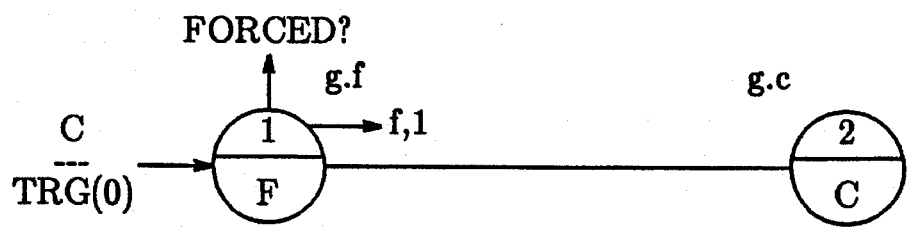
Figure 19:
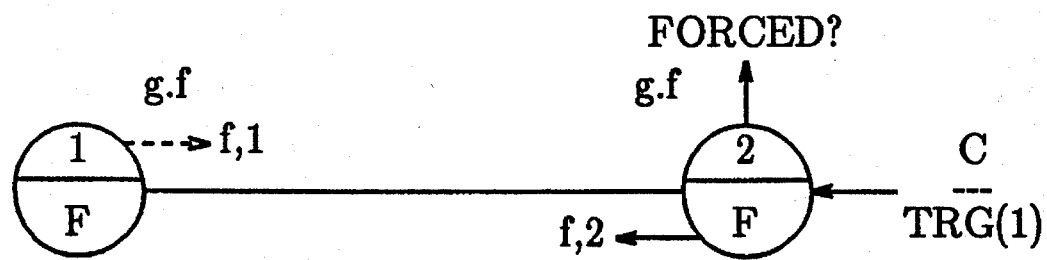
Figure 20:
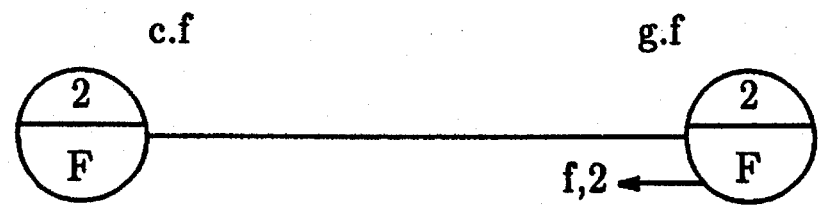

The state of the nodes and link at the commencement of processing is as summarized in FIG. 17. The left-hand node (node 201) has rank 1 ("1" in upper part of the left-hand circle representing the node), the node is CHARGED (C in the left-hand circle representing the node), and the link (link 203) is in the guard.charge (g.c above the line representing the link) role.mode at node 201. (In the following FIGS. 18–27, the reference numerals for nodes 201 and 202 as well as link 203 are not shown on the figures for the sake of clarity.) Also, the clock associated with node 201 is relaxed, inhibited (RX,IN under CL in the left-most portion of FIG. 17). Similarly, the right-had node (node 202) has rank 2, is CHARGED (C), and the link is in the role.mode of guard-.charge at node 202. Also, the clock of node 202 is relaxed, inhibited. Finally, it is presumed that link 203 has a delay of 5 units (as shown by the "5" in parenthesis under the line representing link 203).

For node 201, the first flow diagram of interest is shown by FIG. 9, which pertains to a local message of trigger (recall a trigger occurs at "Time"=0 from the table of FIG. 3) whenever the STATUS of the clock is both relaxed and inhibited. As depicted by block 902, the clock is first set so that clock has clock_state1 and clock_state2 of triggered and inhibited, respectively. Then decision block 903 is entered to see if node 201 is CHARGED, and since it is for the example (refer to the TIME=0 line of FIG. 3), the processing of block 905 is next invoked. An outgoing message of having a "field-out" (FO) of force, and a "rank" (R) of 1 (f,1) is sent onto single link 203 at TIME=1, that is, the next processing interval. Then, all links associated with node 201 are set to role.mode of guard.force (g.f) by block 906. Next, as per block 907, node 201 is set to FORCED (F), and the rank is maintained as "1" by block 908. In addition, a snapped? self message is sent to node 201. The state after a trigger by the clock associated with node 201 is summarized in FIG. 18.

It is assumed that at TIME=1, the clock associated with node 202 also sends a trigger signal. The flow diagram of FIG. 9 also describes the actions taken at node 202 as the result of the change in node 202's clock. The actions are summarized by the depiction of FIG. 19. The message shown as emanating from the left-hand node (dotted f,1) is the message emitted by node 201 which is still propagating over the link, since the link is presumed to have a delay of 5 units.

Figure 12:
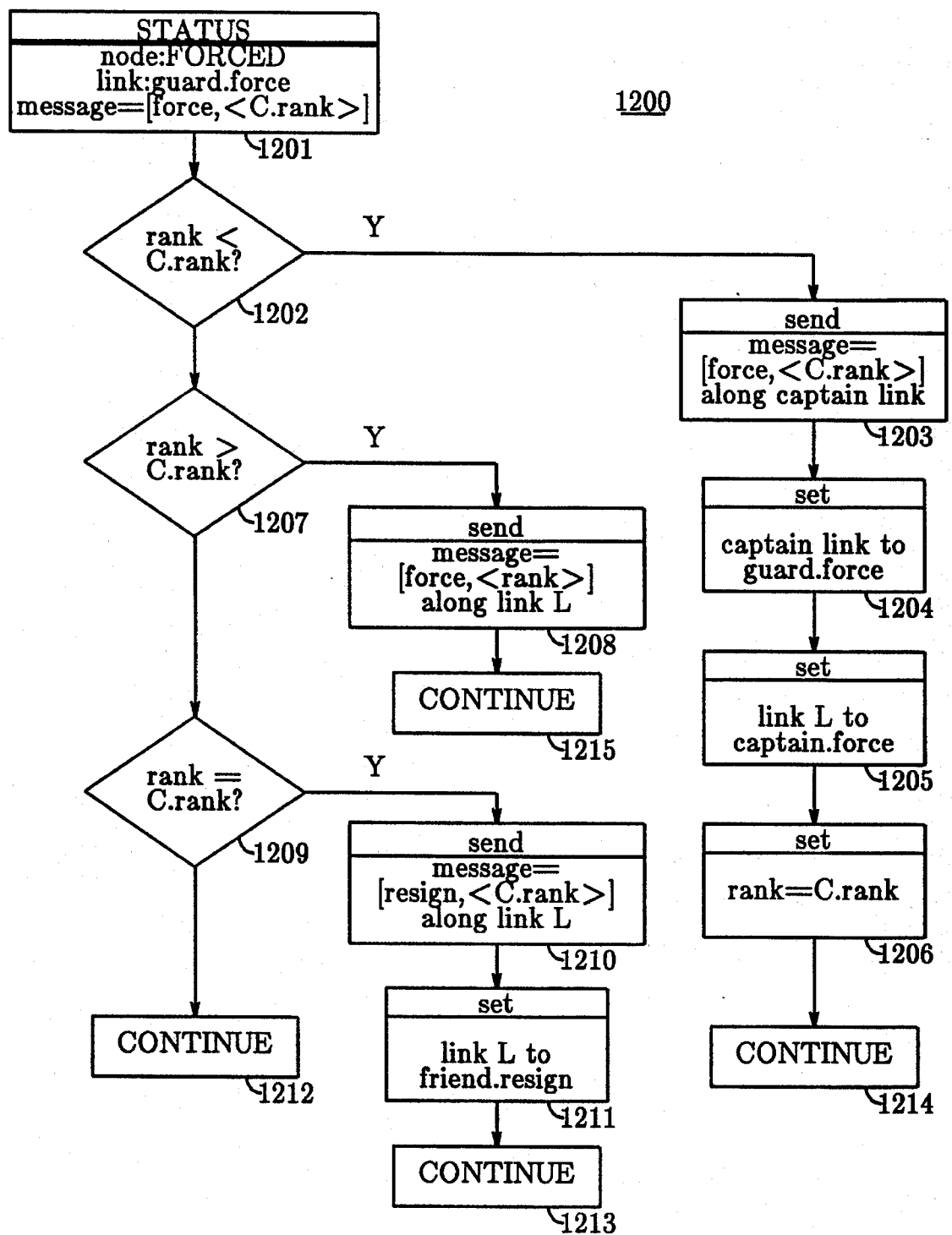

The next activity that occurs results from the arrival of the f,1 message from node 201 at node 202, as depicted by the flow diagram of FIG. 12. The status of node 202 is summarized by block 1201, that is, node 202 is FORCED, the link is in guard.force, and the message arriving is f,1. Decision block 1202 is entered to see if the local rank (rank) is less than the incoming rank (C.rank). In this case the local rank (2) is greater than the incoming rank (1), so decision block 1207 is entered next, followed immediately by processing block 1208 which returns a force message with the local rank of "2" (f,2) back onto the link.

Figure 21:
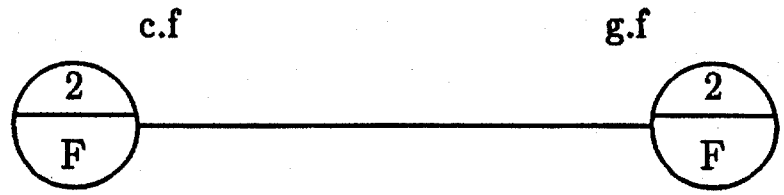

Next, the original f,2 message sent by node 202 arrives at node 201; the flow diagram of FIG. 12 also controls this processing event. Now, since the incoming rank (C.rank=2) is greater than the local rank (rank=1), processing by decision block 1202 results in the invoking of processing block 1203 which, in this case, is a null event since there is no link yet designated a captain link. If there was a captain link, then as per block 1204, this link would be set to guard.force. Next, as indicated by processing block 1205, the incoming link is set to captain.force. Finally, the rank of node 201 is set to the incoming rank. The results of this sequence of events at both nodes 201 and 202 is depicted by the status diagram of FIG. 20. In addition, FIG. 21 summarizes the node and link states after all messages have completed their traversal of the links, and a quiescent state is achieved to await the next activity.

Moreover, the timing diagram of FIG. 3 summarizes the occurrence of these events at node 201. In particular, at TIME=7, it is seen that the incoming f,2 message arrives from node 202, which results in a change in the role.mode to captain.force and the rank to "2". TIME=12 shows the arrival of the second incoming f,2 message from node 202 (which was actually originated by node 201), but this has a null effect due to the prior arrival of the same message. (Formally, this effect may be expressed as a CONTINUE operation, which means that, as per the CONTINUE block 510 of FIG. 5, messages are processed in top-down fashion by blocks 520–521 if there is a self message, or by blocks 530–531 is there is a clock message, or by blocks 540–541 is there is a system message. Moreover, if there is no flow diagram in the set of FIGS. 6–17 that covers a particular STATUS, this is to be interpreted as invoking a CONTINUE operation.) In addition, the timing diagram of FIG. 4 summarizes the occurrence of these events at node 202. In particular, at TIME=6, the f,1 message arrives from node 201, and in the next time interval, the message is converted to a f,2 message and is returned to node 201.

Figure 22:
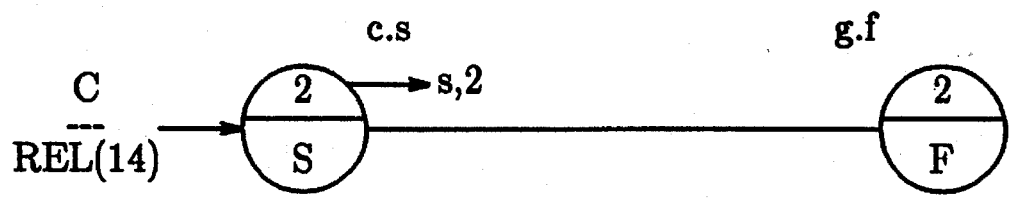

The next processing event occurs at TIME=14 whereupon the clock of node 201 effects a release, that is, the clock changes to the trigger,release (Trg,Rel) state, which is reflected at the next unit of time, namely, TIME=15 in FIG. 3. The flow diagram which summarizes the initial activity resulting from the release of the clock is shown in FIG. 10. With reference to FIG. 10, blocks 1001 and 1002 show the original status and the changed status as a result of the release. Decision block 1003 is entered next: since node 201 is FORCED, and the node has no guard links (therefore there are no links that must equal the mode of snap), there is a branch to block 1004. Processing by block 1004 results in setting node 201 to SNAPPED, and then decision block 1005 is entered—with the question to be resolved is the role of link 203 a captain,? Since link 203 is a captain, then processing block 1008 is invoked, which results in a message of snap,2 being sent onto link 203. As blocks 1009 and 1010 depict, the following actions also occur: the link is set to mode of snap, and a CONTINUE operation is invoked. The state of the nodes and link after the release of the clock associated with node 201 is shown in FIG. 22.

Figure 23:
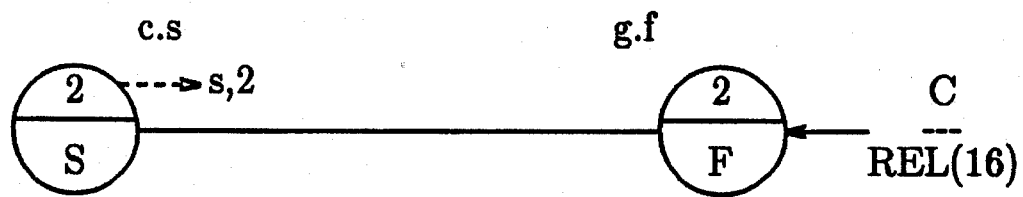
Figure 24:
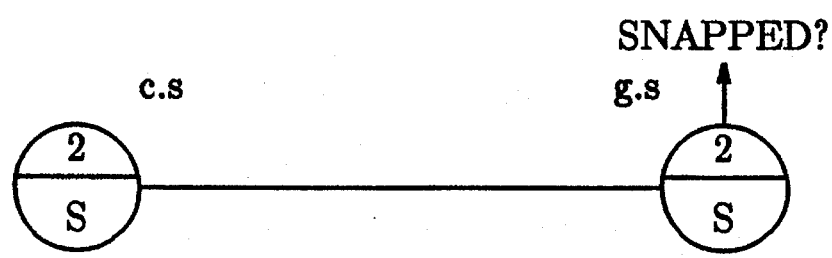
Figure 25:
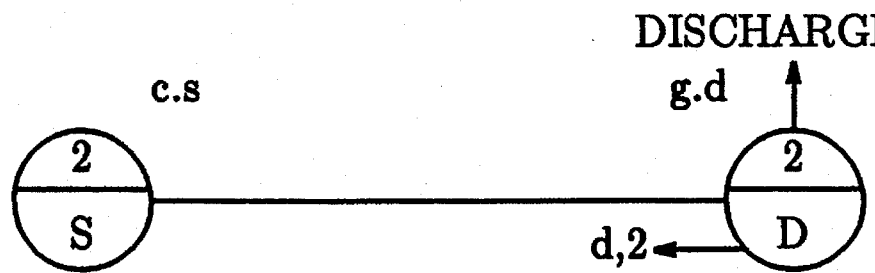

The next event that occurs in marked by the clock associated with node 202 also causing a release, that is, a clock condition of trigger,release occurring at TIME=16. To determine the unfolding of events, reference is first made to FIG. 10. Processing by blocks 1001 and 1002 leads to decision block 1003. Since node 202 is FORCED, but the link is not in the role.mode of guard.snap, a CONTINUE operation is completed via block 1011. The state of the nodes and link at this point in time is shown in FIG. 23. The dotted s,2 indicates that the snap message emitted at TIME=15 from node 201 is still propagating over the link.

Figure 14:
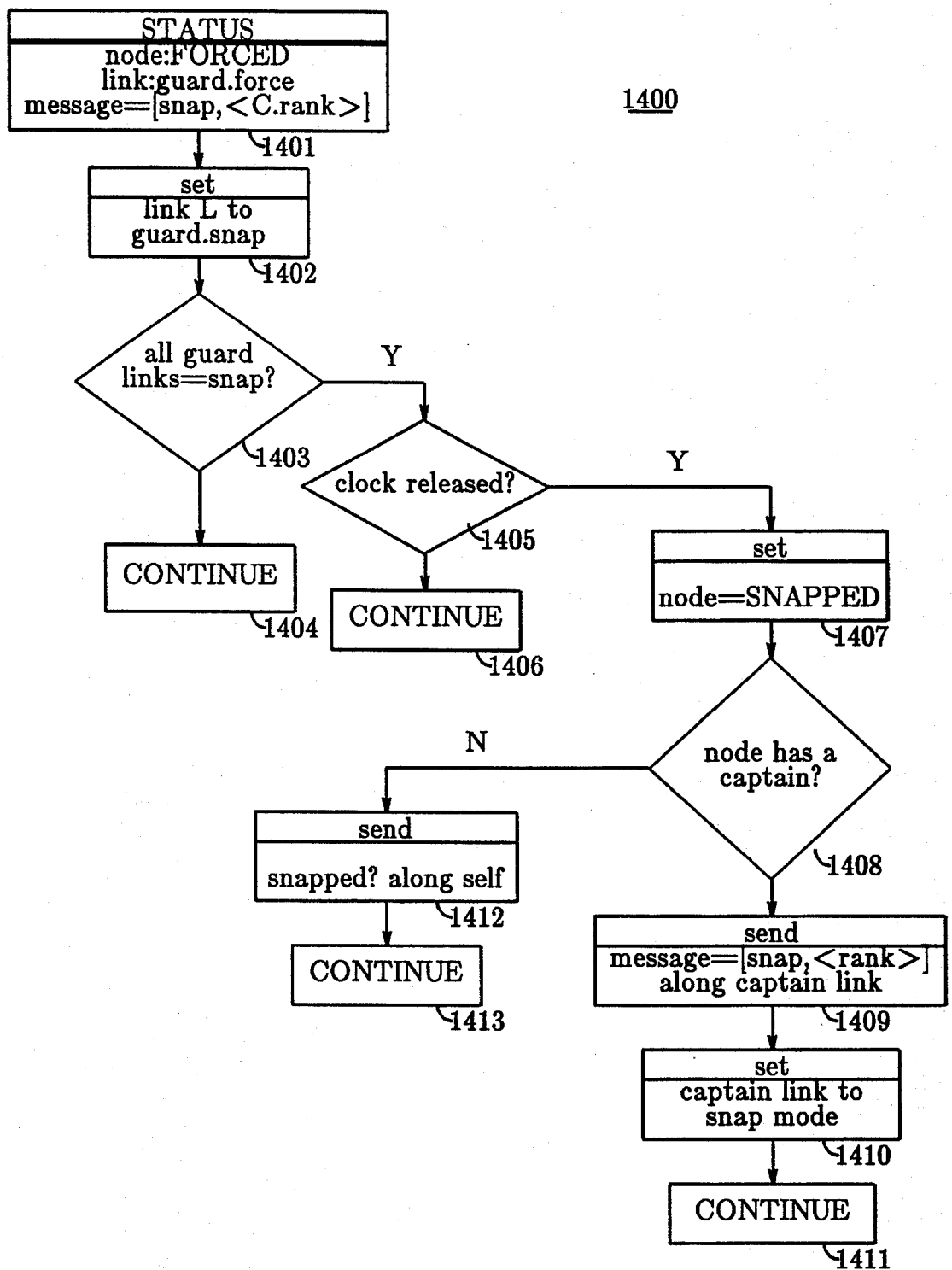

The next event occurs when the s,2 message arrives at node 202 at TIME=21. Since node 202 is FORCED, the link is guard.force, and the incoming message is snap,2, then the flow diagram of FIG. 14 is invoked. With reference to FIG. 14, the first processing block entered is block 1402, whereupon the link is set to guard.snap (g.s). Since all guards are have the snap role, processing by decision block 1403 leads to decision block 1405. Since the clock associated with node 202 has released, processing block 1407 sets node 202 to SNAPPED. Then, decision block 1408 is entered to determine if the node has a captain. Since node 202 does not have a captain, as per blocks 1412 and 1413, a self message of snapped? is sent to node 202 and a CONTINUE operation is effected. The state of the nodes and the link just after the self message are summarized in FIG. 24.

As a result of the snapped self message, processing by the flow diagram of FIG. 7 is invoked next. With reference to FIG. 7, as per block 702, a discharge,2 (d,2) message is emitted on the link by node 202. Also, the next four processing blocks (703–706) lead to: the guard links are set to a mode of discharged; the node is set to DISCHARGED; a self message of discharged? is sent; and a CONTINUE operation is completed. The state of the nodes and the link just after this last self message are summarized in FIG. 25.

As a result of the discharged? self message, processing by the flow diagram of FIG. 8 is invoked next. With reference to FIG. 8, processing by block 802 leads to the CONTINUE operation of block 803 since node 202 has a guard link.

Figure 15:
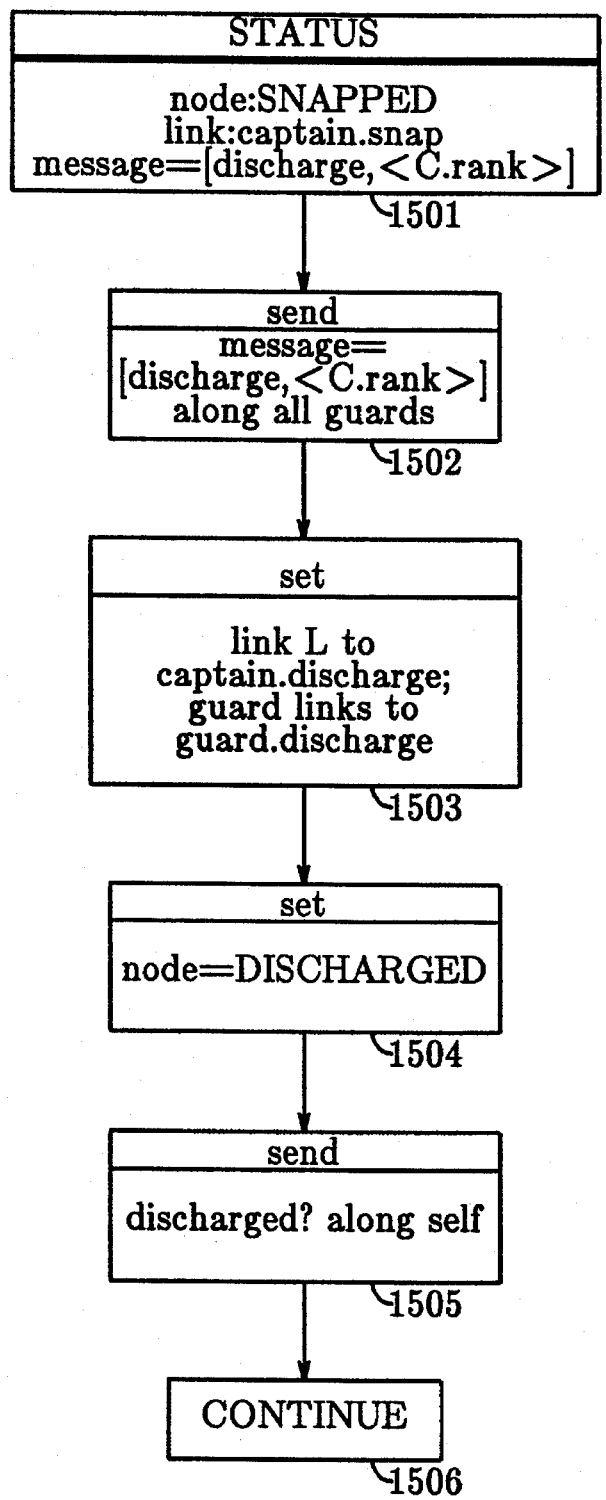
Figure 26:
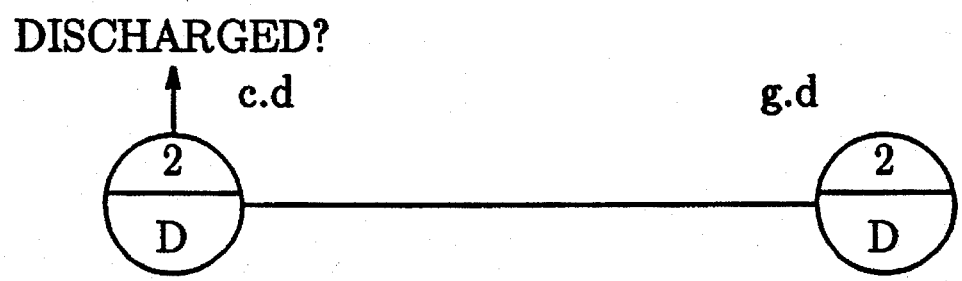

The next processing event occurs at TIME=27 when the d,2 link message arrives at node 201. The flow diagram of FIG. 15 is then invoked. With reference to FIG. 15, since the status of node 201 is SNAPPED, the link is captain.snap (c.s), and the message is discharge,2, processing by the remaining blocks 1502–1506 leads to: setting the link to captain.discharge (note block 1502 is a null operation since there are no guard links); setting node 201 to DISCHARGED; and sending a discharged? self message to node 201. The state of the nodes and link at this point is shown in FIG. 26.

Figure 27:
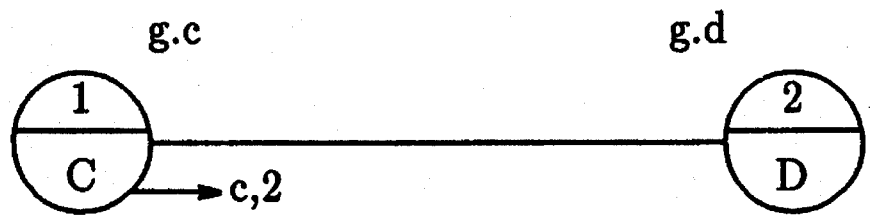

As a result of the discharged? self message, processing by the flow diagram of FIG. 8 is invoked next. With reference again to FIG. 8, processing by block 802 leads to the sequence of processing blocks 804–808 since node 201 does not have any guards. As per block 804, a charge,2 (c,2) message is sent over the link, followed by changing the link to guard.charge (block 805), setting the node to CHARGED (block 806) and the rank back to "1", and incrementing the phase of the clock by one (P becomes P+1) (whereupon processing by node 201 may commence—including a step of re-setting the clock to released,inhibited). The state of the nodes and the link after processing by the flow of FIG. 8 is shown in FIG. 27.

Figure 16:
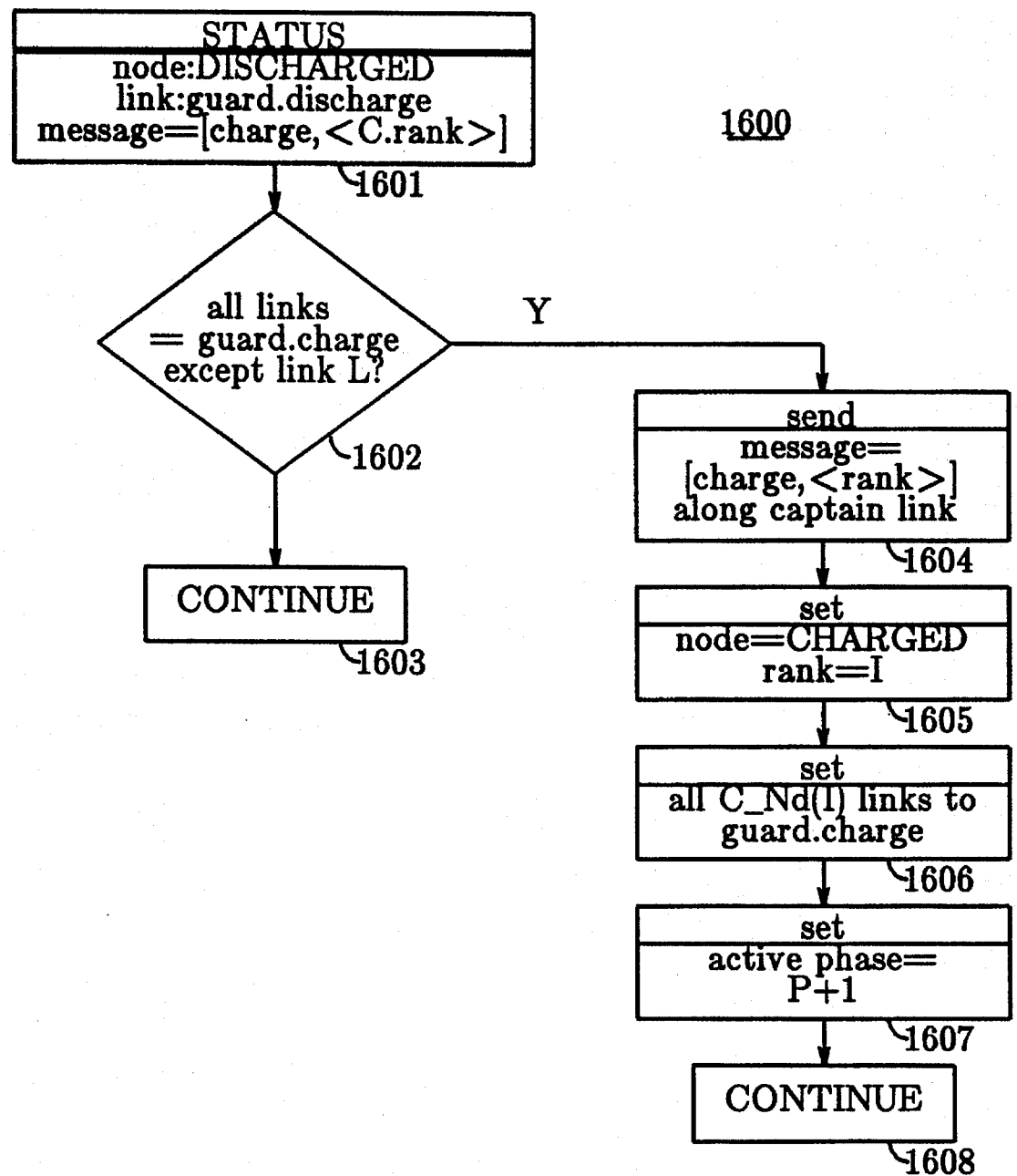

Finally, at TIME=35, the c,2 message arrives at node 202. The flow diagram of FIG. 16 is then invoked. With reference to FIG. 16, decision block 1602 leads to processing by blocks 1604–1608 (since there is only one link in guard.discharge, that is, "all links=guard.charge except the incoming link"). As a result of processing by blocks 1604–1608, node 202 is returned to CHARGED, the rank remains rank=2, link 203 is set to guard.charge, and the clock is advanced (P to P+1). It is presumed that the processing by node 202 leads to re-setting of the clock to relaxed,inhibited, followed by a CONTINUE operation. After all processing is complete, the state of the nodes and link is, once again, as depicted in FIG. 17.

The timing diagrams of FIGS. 3 and 4 summarize the states of the nodes and link as effected by processing of self messages, clock messages, and system messages.

B. Fully-Connected Three Node Case

Figure 28:
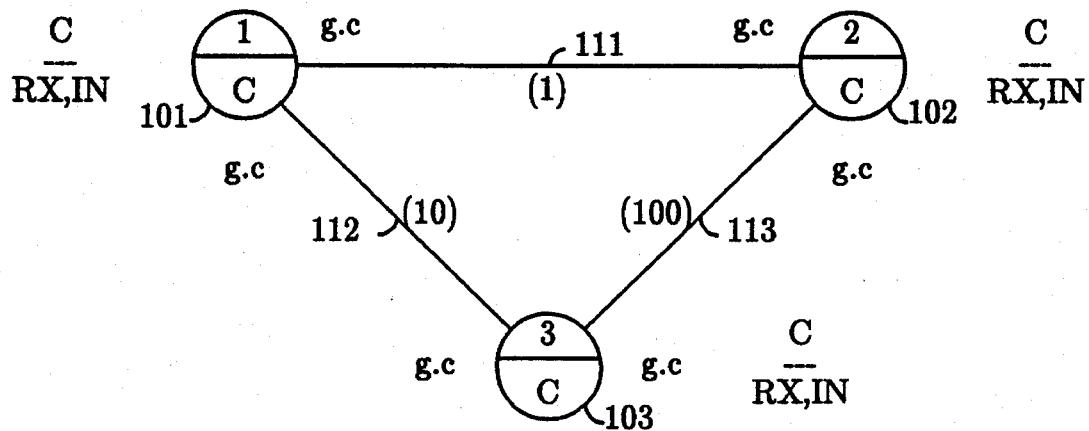
FIGS. 28–48 depict the state of the nodes and the links for the three-node, fully-connected example at various stages due to self messages, clock messages, and system messages.

With reference to FIG. 28, an exemplary fully-connected network having three nodes 101–103 and three interconnecting links 111–113 is depicted (FIG. 28 is commensurate with FIG. 1 and is labeled accordingly; for FIGS. 28–48, the reference numerals for the nodes and links are omitted for the sake of clarity). For purposes of this illustrative example, nodes 101–103 each have the same status upon initialization, namely, each node state is CHARGED, and the rank of each node is its physical node identifier; thus, node 101 has rank=1, node 102 has rank=2, and node 103 has rank=3. The initial role and mode of links 111–113 are guard.charge, respectively. As in the previous two-node example, each node has a computing entity associated with the node (in this case the entities are not shown since their relation to each node and their operation are completely analogous to the entities 205 and 206). Accordingly, each entity is presumed to have a clock (not shown), and each clock is assumed to have an initial state described by relaxed.inhibited. In addition, the initial count of each clock is P.

In order to clarify and concisely discuss the node states, link states, and clock states, it is again most expeditious to present a series of state diagrams which are obtained by tracing the state transitions with the guidance of the flow diagrams in FIGS. 5–17. The state of the nodes, links, and clocks at the commencement of processing is as summarized in FIG. 28. It is to be noted that the delays of links 111, 112, and 113 are, respectively, 1 unit, 10 units, and 100 units (shown in parenthesis next to each link). These delays are selected so that signals propagating on the different links are essentially non-overlapping, which helps clarify the discussion.

Figure 29:
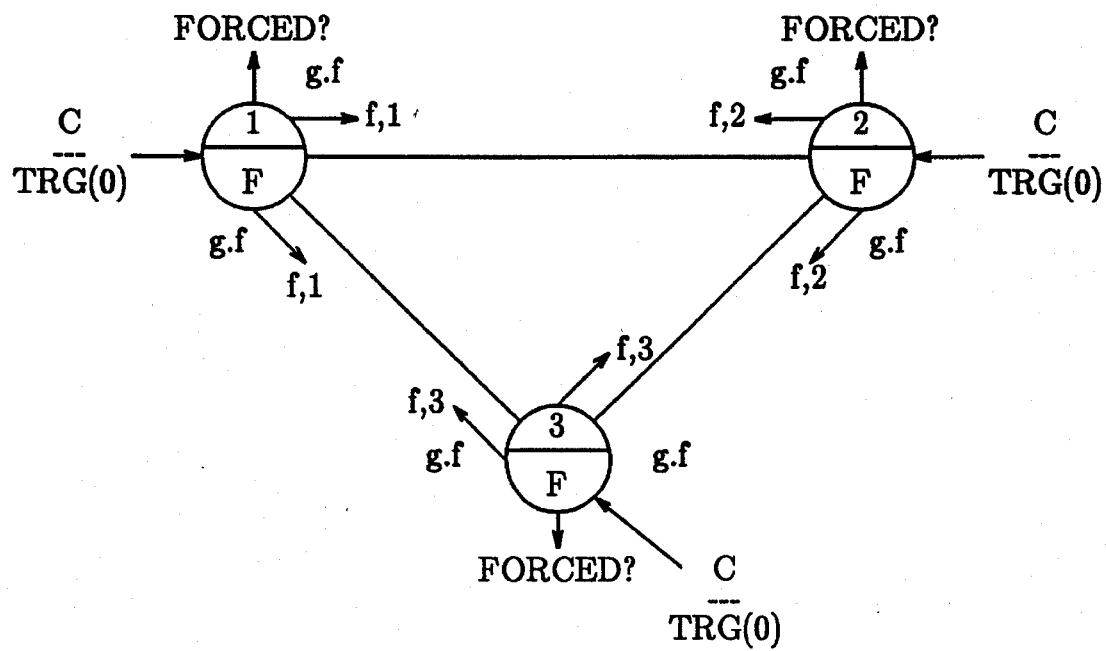

At TIME=0, with reference to FIG. 29, it is presumed for this example that each clock initiates a trigger message. The first flow diagram of interest is shown in FIG. 9, which pertains to a local clock message of trigger. As depicted by block 902, each clock is then set to the triggered,inhibited state. Then decision block 903 is entered to see if the associated node is CHARGED, and since each node is in the CHARGED state, then processing of block 905 is invoked. An outgoing message of force.rank is emitted for each node; accordingly, node 101 emits a f,1 message over both links 111 and 112; node 102 emits a f,2 message over both links 111 and 113; and node 103 emits a f,3 message over both links 112 and 113. Then, each end of each link is set to guard.force, and each node is set to FORCED and each node maintains its original rank, as per blocks 906–908. In addition, a forced? self message is circulated to each node—which ultimately effects a CONTINUE operation. The state after the trigger events at TIME=0 at each node is summarized in FIG. 29.

Figure 30:
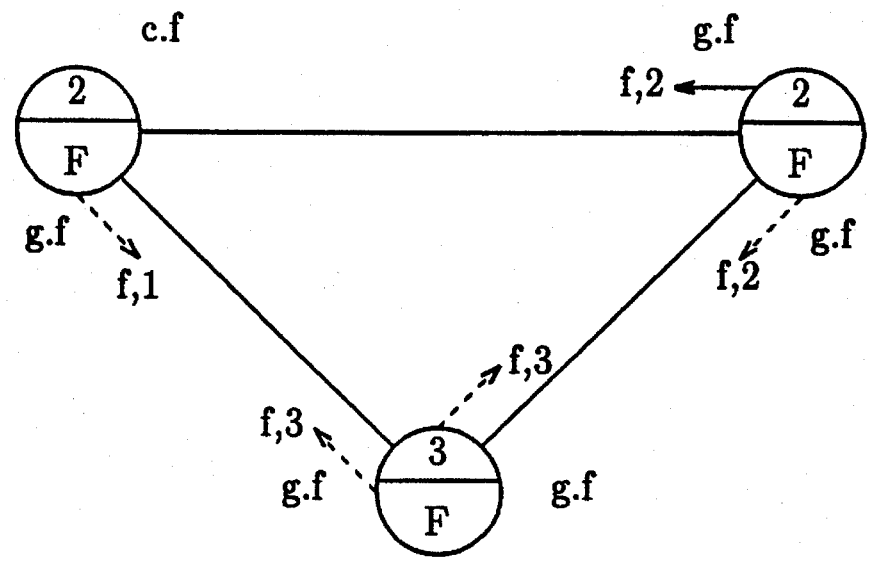

The next state of interest is shown in FIG. 30, wherein the f,2 message has arrived at node 101 and the f,1 message has arrived concurrently at node 102. The flow diagram of FIG. 12 depicts the activity that occurs in each node. First, for node 101, the incoming rank (2) is greater than the local rank (1), so processing by blocks 1203–1206 and 1214 is entered via decision block 1202. Blocks 1203–1204 result in essentially null activities since there are no captain links as yet. Block 1205 leads to setting the incoming link 111 to captain.force, and the local rank is set so that rank=2 via block

1206. Second, for node 102, the incoming rank (1) is less than the local rank (2), so processing by blocks 1208 and 1215 is effected after pass-through by decision blocks 1202 and 1207. Block 1208 leads to returning a f,2 message back along link 111 from node 102. The state of the network at this point in time is shown in FIG. 30. The dotted messages (f,1, f,2, and f,3) indicate messages still propagating in the network as a result of the trigger by each clock at TIME=0.

Figure 31:
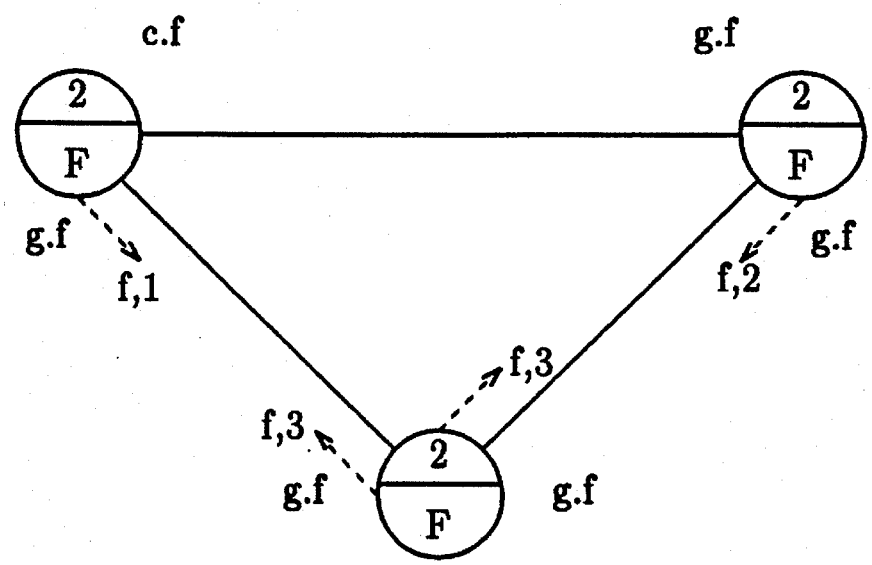

The next state of interest occurs when the second f,2 message reaches node 101. Now, since the role.mode of link 111 at node 101 is captain.force, and there is no corresponding flow diagram in the set of FIGS. 6-17, by definition the only activity is one of CONTINUE. The state of the network at this point in time, namely, TIME=4, is shown in FIG. 31. Now, there are no messages traversing link 111, but the earlier messages from node 101 to node 103, and vice versa, are still traversing link 112, and similarly for link 113 between nodes 102 and 103.

Figure 32:
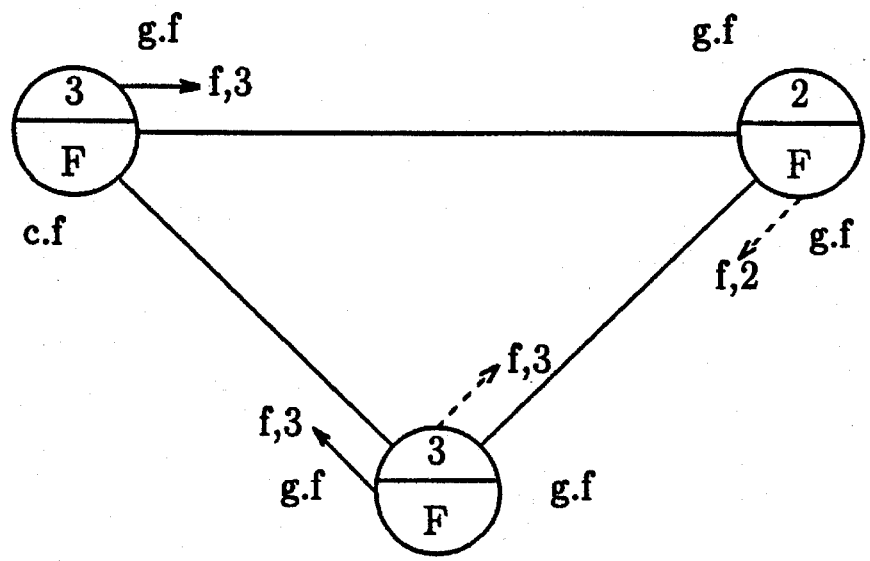

The next state of interest occurs when the f,3 message reaches node 101 and the f,1 message simultaneously reaches node 103 at TIME=11. First, the f,3 message causes the flow depicted by FIG. 12 to be invoked. Since the incoming rank (3) is greater than the local rank (2), processing by blocks 1203-1206 and 1214 leads to: sending a f,3 message along the captain link 111; changing the captain link 111 to guard.force; setting link 112 to captain.force, and setting the local rank to rank=3. Second, the arrival of the f,1 message at node 103 having an incoming rank=1 results in, as per blocks 1202, 1207, 1208, and 1215, a returning of a f,3 message to node 101 on link 111. The state of the network after the aforementioned activities is shown in FIG. 32.

Figure 33:
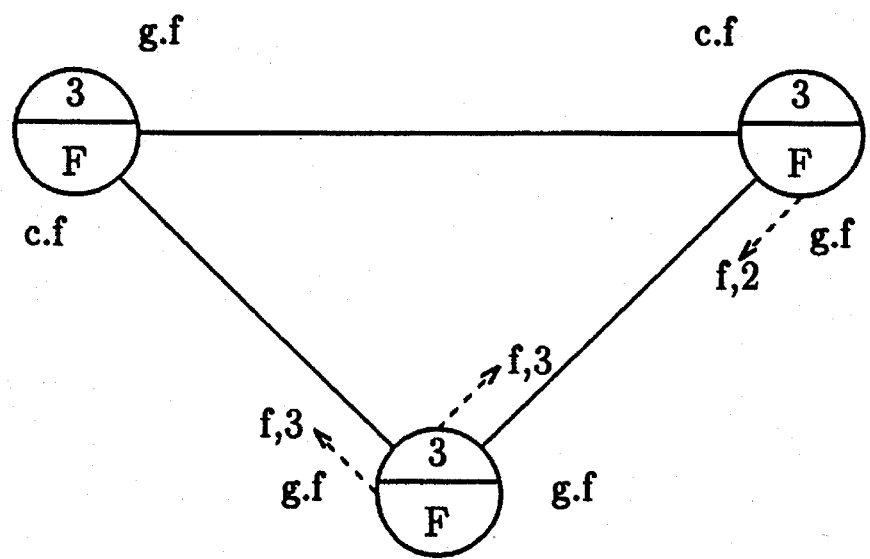

The next state of interest occurs at TIME=13, when the f,3 message traveling from node 101 to node 102 arrives at node 102. Since the rank of the incoming message (3) is greater than the local rank (2), processing by blocks 1203-1206 and 1214 is completed, which leads to changing link 111 to captain.force at node 102, and changing the rank of node 102 to rank=3. The state of the network after these activities is shown in FIG. 33.

Figure 34:
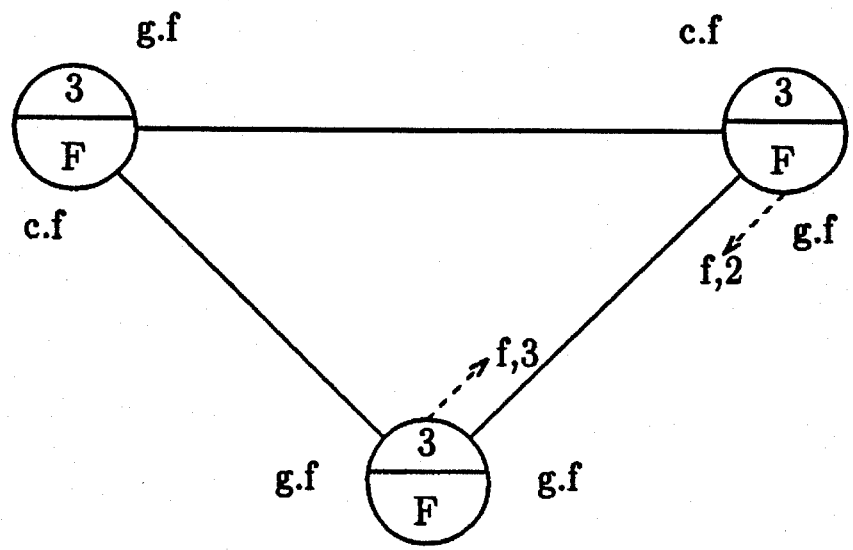

The next state of interest occurs at at TIME=22, when the f,3 message traveling from node 103 to node 101 arrives at node 101. The status of node 101 results in a CONTINUE operation. The state of the network after these activities is shown in FIG. 34. Now, both links 111 and 112 are quiescent in the sense that no messages are propagating over these links; the only messages still propagating in the network are along link 113.

Figure 35:
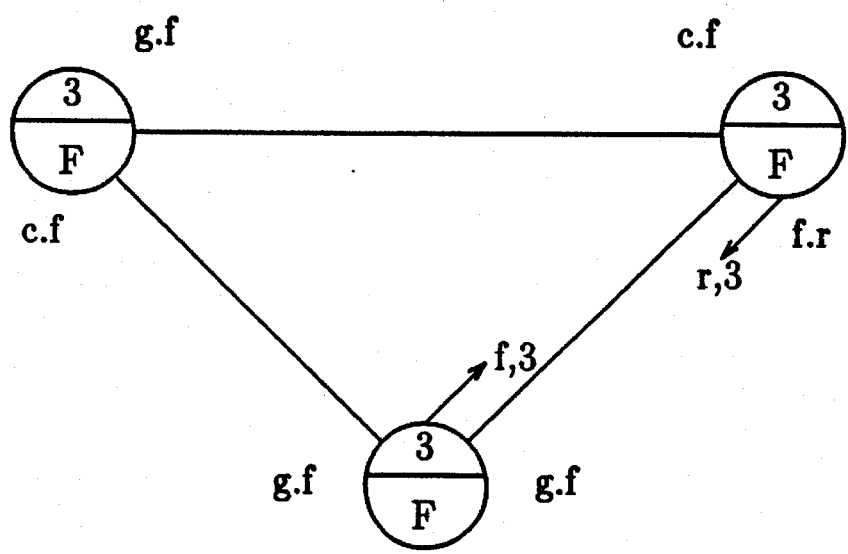

The next state of interest occurs at TIME=101, when the f,2 message arrives at node 103 and the f,3 message arrives concurrently at node 102. First, since the rank of node 102 has been modified by an earlier arriving message to attain rank=3, and node 102 is FORCED and link 113 at node 102 is guard.force, the flow depicted by FIG. 12 is effected. The result of processing by decision blocks 1202 and 1207 ultimately leads to decision block 1209, whereupon there is a branch to the sequence of blocks 1210-1211-1213. Block 1210 causes a resign,3 (r,3) message to be sent back along link 113, and block 1211 causes the link to be set to friend.resign (f.r) (this role.mode is an indication for link 113 to, in effect, be temporarily removed for the remainder of the synchronization cycle). Second, for message f,2 arriving at node 103, since the local rank (3) is greater than the incoming rank (2), the flow of FIG. 12 indicates that a f,3 message is returned over link 113 (as per processing blocks 1202, 1207, 1208, and 1215). The state of the network after the processing at nodes 102 and 103 is as shown in FIG. 35.

Figure 13:
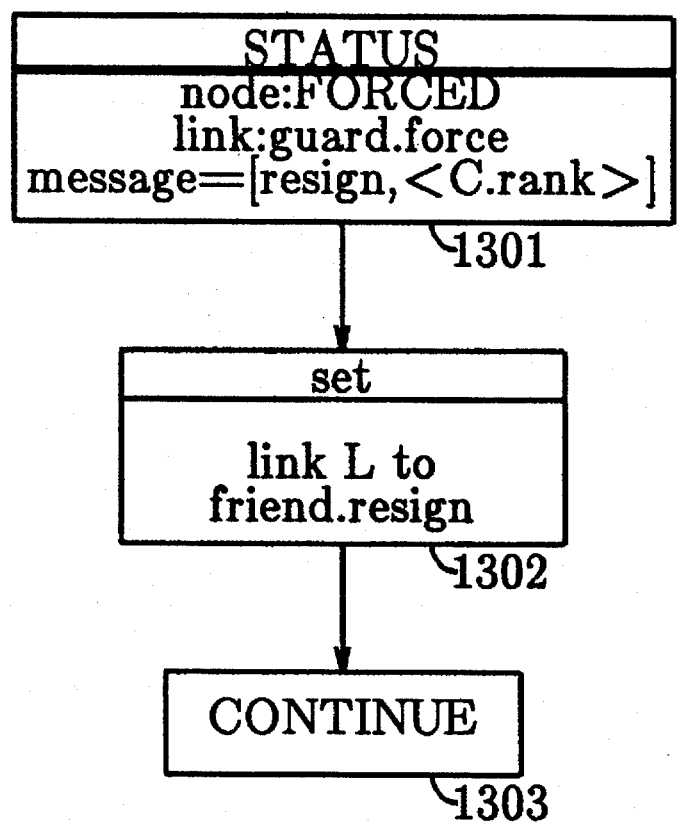
Figure 36:
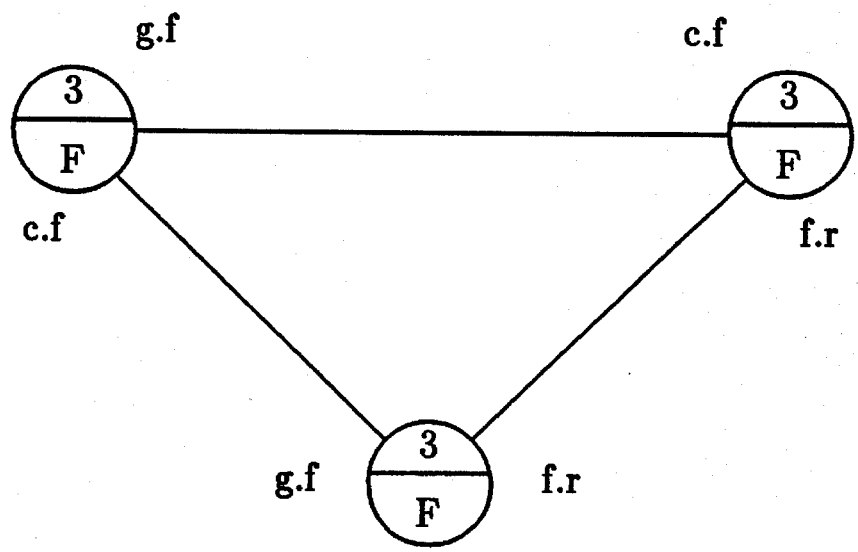

The next state of interest occurs at TIME=202, when the r,3 message arrives at node 103 and the f,3 messages arrives at node 102. First, the f,3 message at node 102 is merely a repeat of the same message that arrived at TIME=101, so a CONTINUE operation occurs. Second, the r,3 message arriving at node 103 is controlled by the flow diagram of FIG. 13. With reference to FIG. 13, it is seen that link 113 is set to friend.resign by processing block 1302, followed by a CONTINUE operation. The state of the network after the processing at nodes 102 and 103 is as shown in FIG. 36. Now, all messages initiated at TIME=0 have traversed the network and a rooted tree has been formed. In particular, node 103 is the root of the tree (the so-called "supercaptain"), that is, node 103 is not connected to another node through a captain link. On the other hand, node 101 has captain link 111 which points to or connects to its captain node 103. In turn, node 102 has a captain ink 112 which points to or connects to its captain node 101. As alluded to above, operation of link 113 is considered as temporarily suspended for the remainder of the synchronization cycle.

Figure 37:
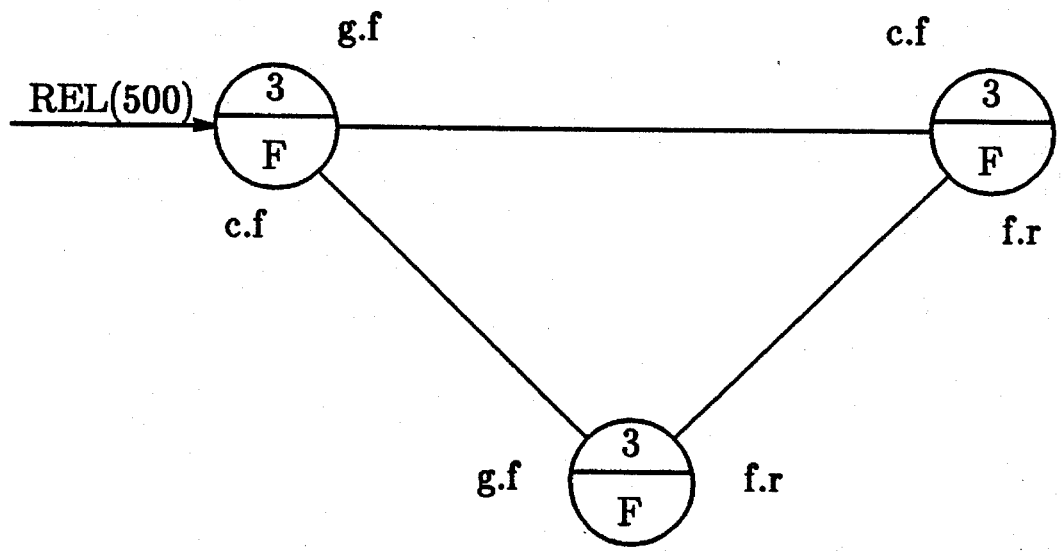
Figure 38:
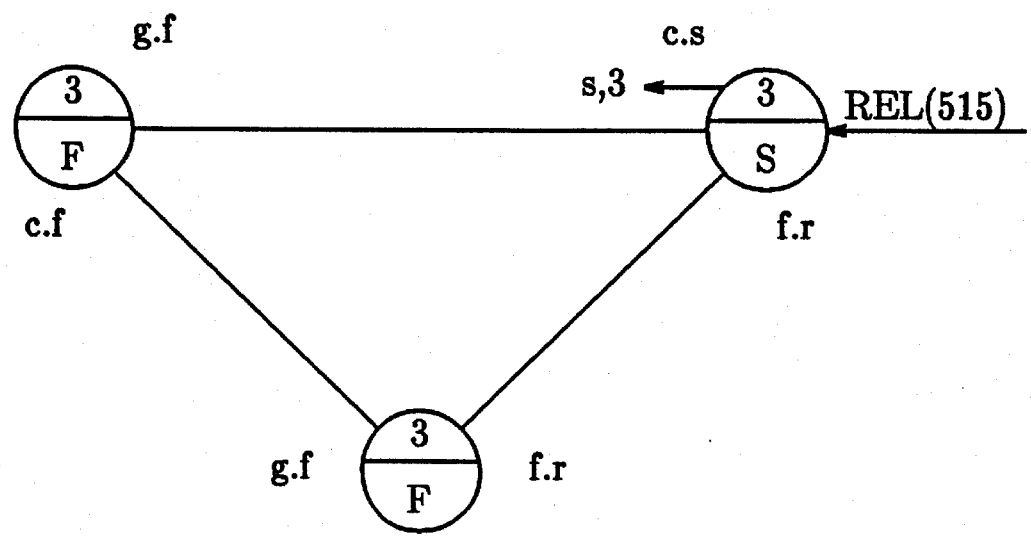

Now, with reference to FIG. 37, it is presumed that the clock associated with node 101 causes a release signal at TIME=500. To see the effect of this clock signal, reference is now made to FIG. 10. First, processing by block 1002 causes this clock to enter the triggered,released state, and the processing by decision block 1003 leads to a CONTINUE operation since node 101's only link is not in the mode of snap.

Next, it is presumed that the clock associated with node 102 initiates a release signal at TIME=515. Again the flow set forth in FIG. 10 is traced. Now, since node 102 does not have any guard links (only a captain link), and node 102 is FORCED, then the result decision block 1003 leads to setting node 102 to SNAPPED. Moreover, since node 102 has a captain, the decision by block 1005 leads to processing by the sequence of blocks 1008-1010. First, a snapped,3 message is sent over link 111, the captain link, as per block 1008. Then, this captain link is set to captain.snap (c.s), and a CONTINUE operation is effected. The state of the network at this point is time is summarized by FIG. 38.

Figure 39:
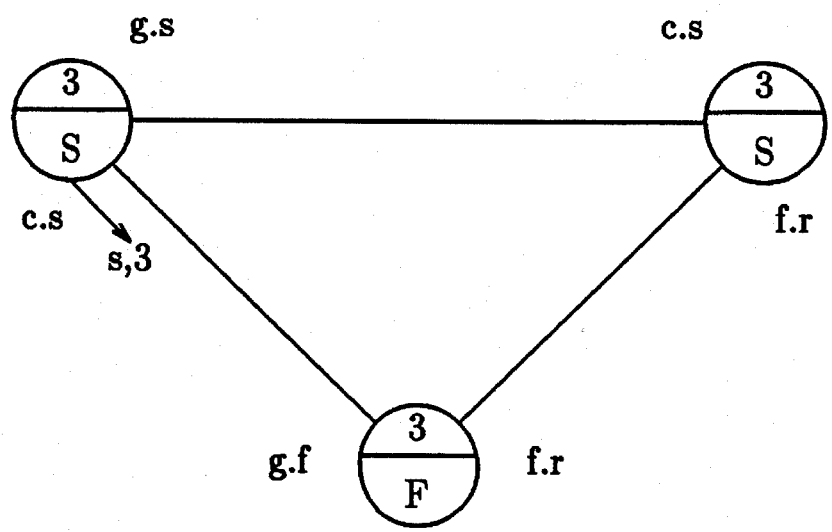

The next state of interest occurs when the s,3 message arrives at node 101 at TIME=517. Since node 101 is FORCED and its link is guard.force, the flow diagram of FIG. 14 is followed. Initially, the link is set to guard.snap (g.s) by processing block 1402. Then decision block 1403 yields a Yes (Y) response since the (only) link is guard.snap. Accordingly, decision block 1404 is entered, and since the clock associated with node 101 has already released, processing by block 1407 is invoked next, whereupon node 101 is set to SNAPPED. Next, as a result of decision block 1408 yielding a Y (Yes), processing blocks 1409-1411 are completed: first, a snap,3 (s,3) message is sent over link 112, then the captain link is set to captain.snap (c.s), and a CONTINUE operation is completed. The state of the network after the above activities is shown in FIG. 39.

Figure 40:
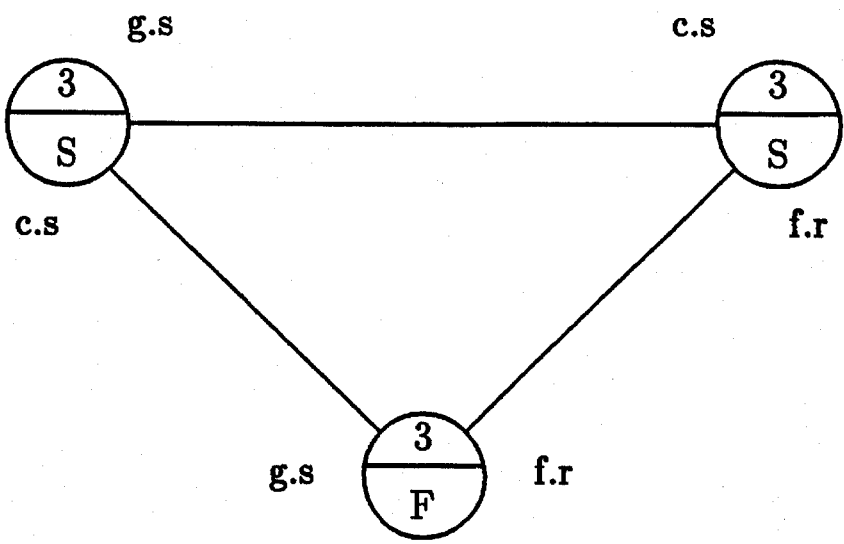

The next state of interest (TIME=528) occurs when the s,3 message arrives at node 103. Because of the existing status of node 103 when this message arrives, the flow diagram of FIG. 14 is carried out. Thus, link 112 is set to guard.snap (block 1402), and decision block 1405 is entered via decision block 1404 since the only link has a role of snap. However, since the clock associated with node 103 is presumed not to have initiated a release as yet, only the CONTINUE operation of processing block 1406 is effected. The state of the network after these actions is shown in FIG. 40.

Figure 41:
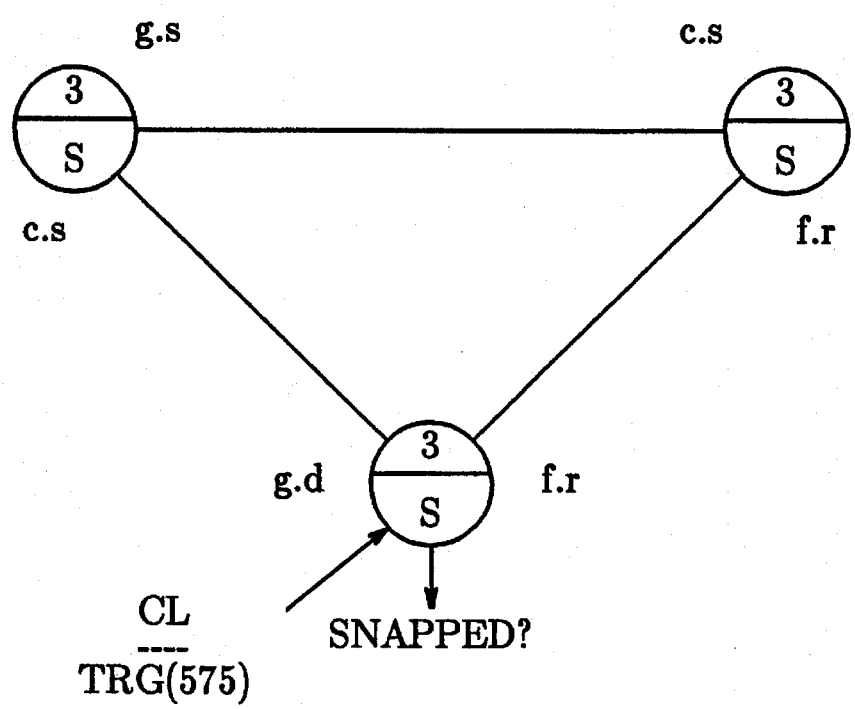

The next state of interest occurs at TIME=575 when the clock associated with node 102 emits a release. Processing by the flow diagram of FIG. 10 is then completed. The clock is set to *,released by block 1002, and decision block 1003 is entered to determined the next step. Since node 103 is FORCED, and the only guard link is set to snap, processing by block 1004 is then invoked, whereupon node 103 is set to SNAPPED. Since node 103 has no captain, a snapped self message is sent (block 1006) and then a CONTINUE operation is called. The state of the network after these actions is shown in FIG. 41.

Figure 42:
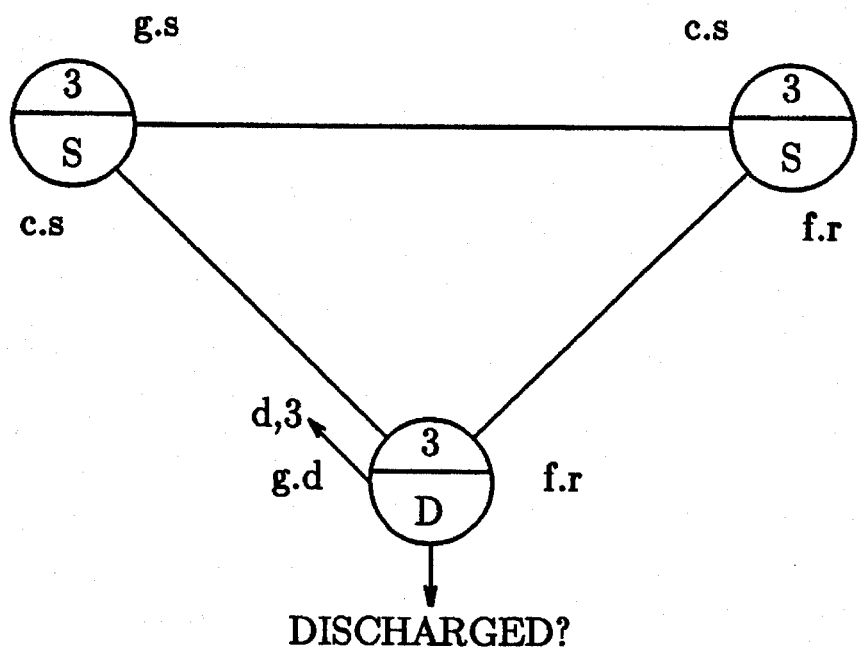

The snapped? self message at node 103 causes the flow diagram of FIG. 7 to be followed. The processing by blocks 701–706 leads to: a discharge,3 (d,3) message being sent over guard link 112, link 112 is then set to guard.discharge (g.d), node 103 is set to DISCHARGED, and a self message of discharged? is returned to node 103. The state of the network after these actions is shown in FIG. 42.

As a result of the discharged? self message at node 103, FIG. 8 is now referenced. Since node 103 has a guard link, processing by block 802 leads to a CONTINUE operation, as per block 803.

Figure 43:
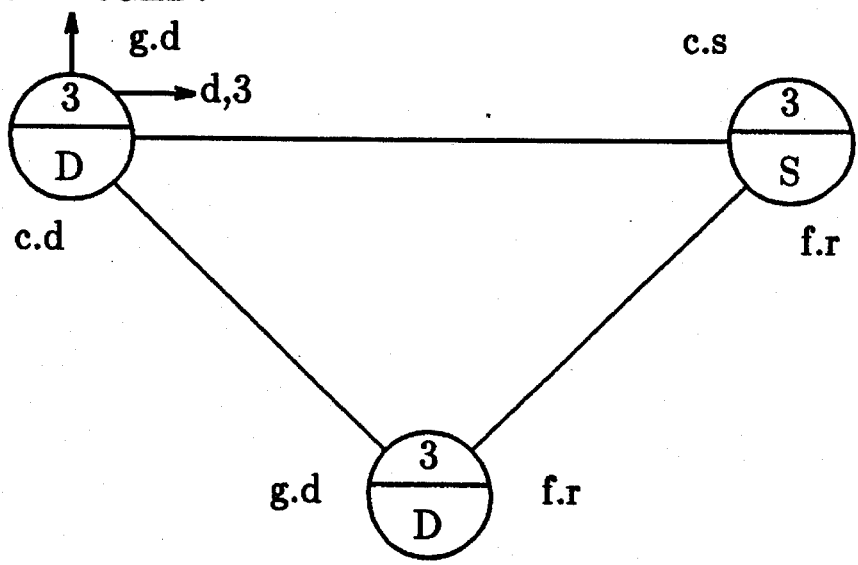

The next state of interest occurs when the d,3 message reaches node 101. Because of the status of node 101, the processing blocks 1502–1506 of FIG. 15 are then invoked. The incoming d,3 message leads to sending the same d,3 message over link 111 (block 1502), to setting link 112 to captain.discharge (c.d) (block 1503), to setting node 101 to DISCHARGED (block 1504), and to sending a self message of discharged? to node 101 (block 1505). The state the network after the occurrence of these activities is shown in FIG. 43.

Because of the self message of discharged at node 101, it is again necessary to trace the flow through FIG. 8. Since node 101 has a guard, processing by block 802 leads to block 803, wherein a CONTINUE operation is invoked.

Figure 44:
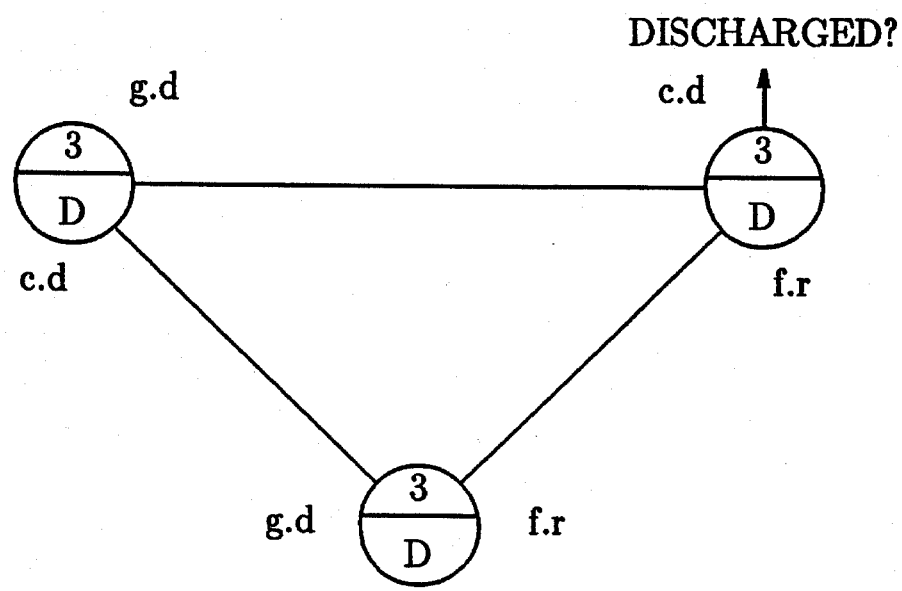

The next state of interest occurs when the d,3 message arrives at node 102. The flow of FIG. 15 is now pertinent. Again, processing by blocks 1502–1506 leads to the following sequence of activities: since there are no guard links, block 1502 is a null event; link 111 is set to captain.discharge; node 102 is set to DISCHARGED; and a self message of discharged? is circulated to node 102. The state of the network after processing by the blocks of FIG. 15 is shown in FIG. 44.

Figure 45:
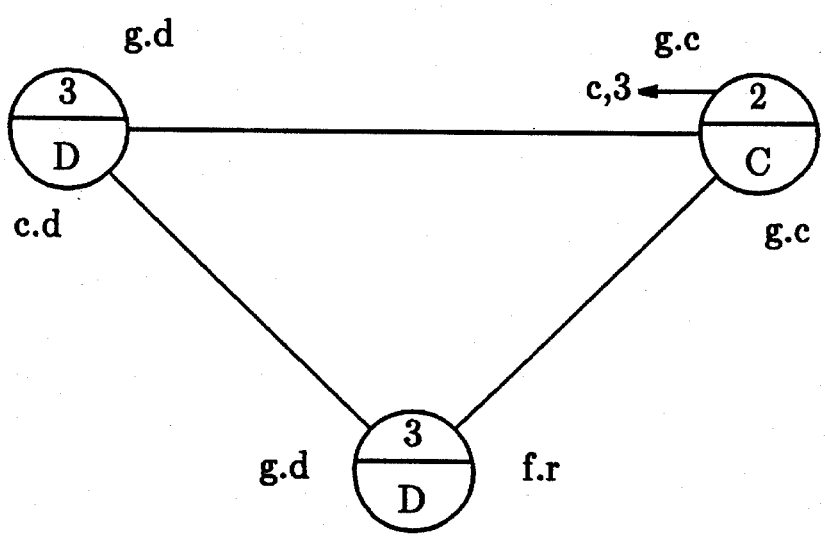

Because of the self message of discharged? returned to node 102, the flow of FIG. 8 must be followed. Now, since node 102 does not have a captain, blocks 804–808 are traversed. Accordingly, a charge,3 (c,3) message is sent over link 111; all links are set to guard.charge, including link 113 which has remained in friend.resign since it was placed in that role.mode; node 102 is set to CHARGED and the rank of node 102 is reset to its physical descriptor; and processing by node 102 is now allowed whereupon the active phase is incremented by one (P goes to P+1). The state of the network after this processing is shown in FIG. 45.

Figure 46:
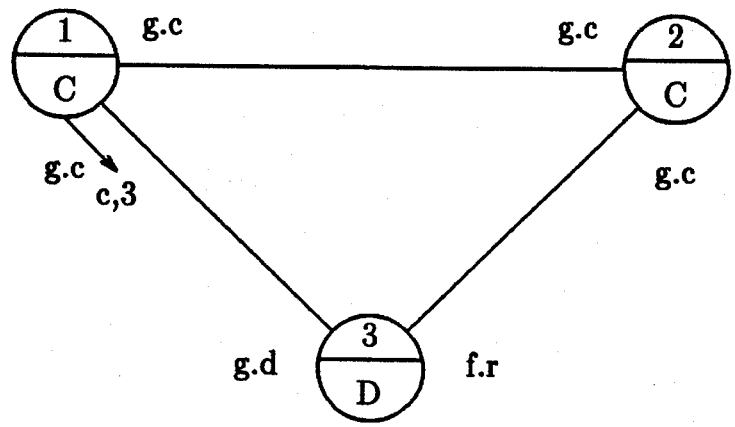

The next state of interest occurs when the c,3 message arrives at node 101. Because of the status of node 101, the flow diagram of FIG. 16 is invoked. The results of decision block 1602 leads to processing by blocks 1604–1608 since the only existing link is the incoming link (L), so all links except L are in guard.charge (block 1602). The c,3 message is forwarded along link 112, node 101 is set to CHARGED and the original rank=1 of node 101 is restored. In addition, all links associated with node 101 are set to guard.charge. Node 101 may commence active processing, and the phase P in node 101 is advanced by one (P goes to P+1). Finally, the CONTINUE operation is invoked. The state of the network after these events is shown in FIG. 46.

Figure 47:
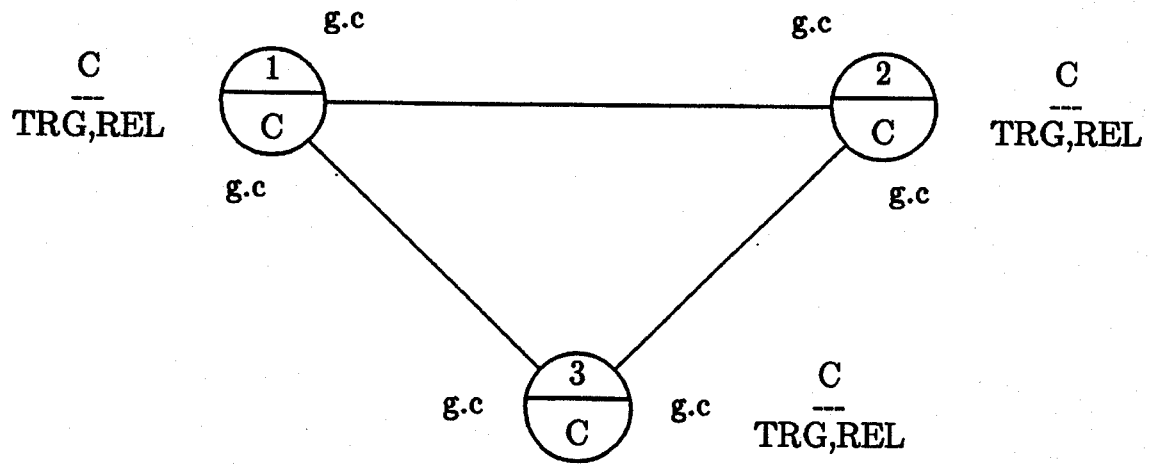

The next state of interest occurs when the c,3 message arrives at node 103. A traversal of the processing shown in FIG. 16 leads to: setting node 103 to CHARGED (the rank is already the physical descriptor); setting link 112 to guard.charge; and allowing node 103 to process data with an active phase of P+1. The state of the network after this processing is shown in FIG. 47. Also shown in FIG. 47 are possible states of each clock associated with each node at this point in time. Recall, that all clocks associated with the nodes have initiated a release.

Figure 48:
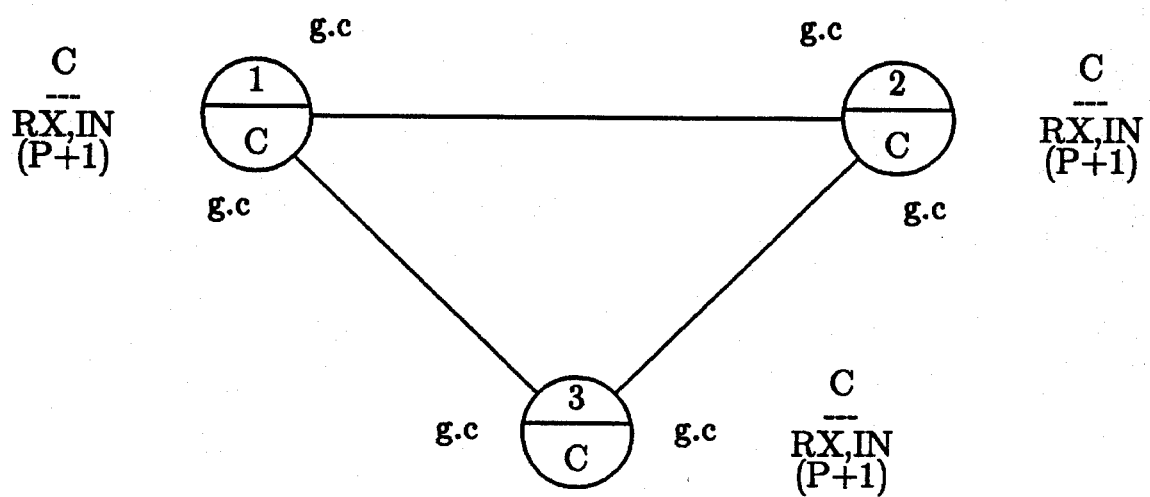
Figure 49:
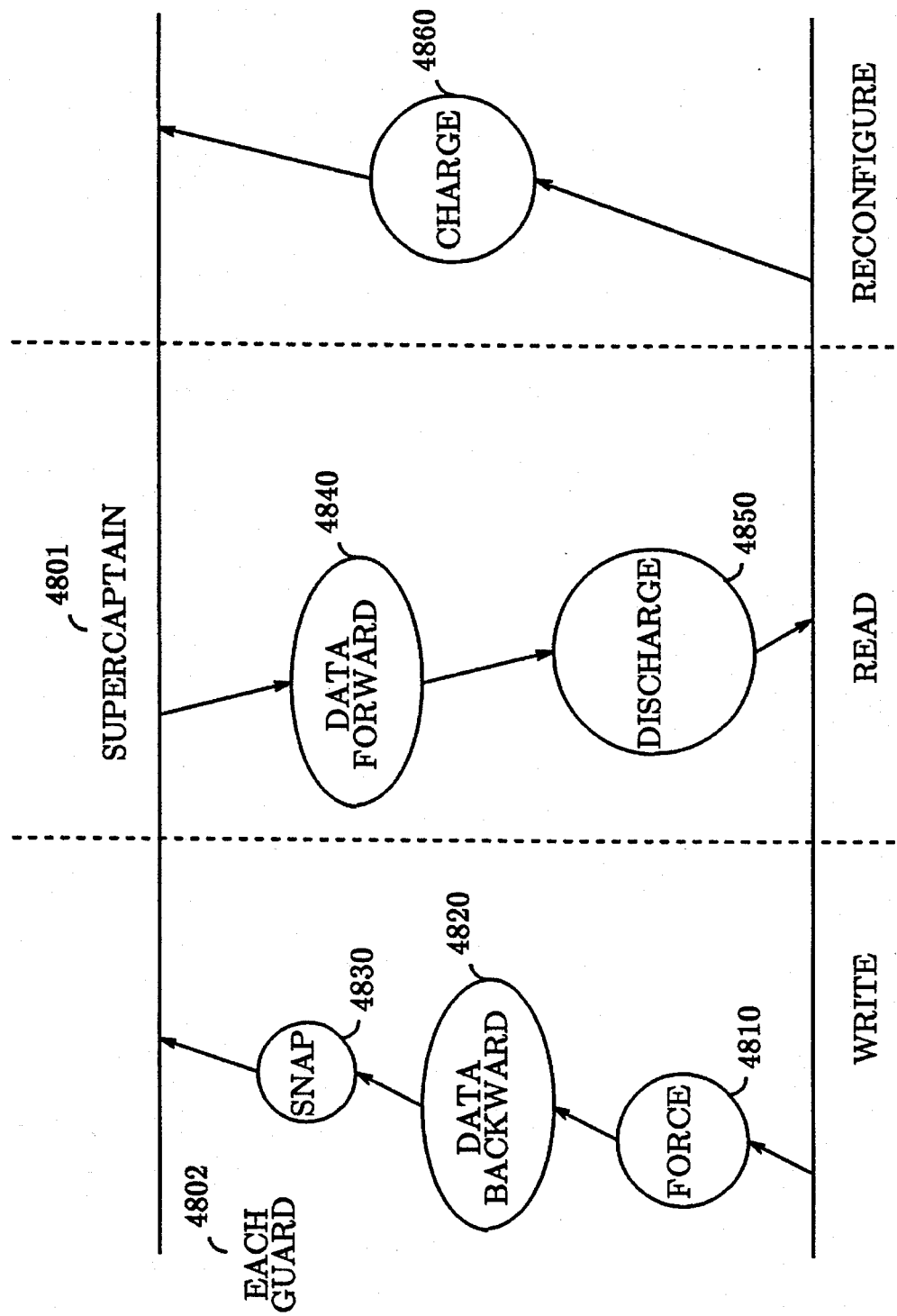
FIG. 49 shows the distribution of backward propagating data and forward propagating data relative to the occurrences of the system messages.

Finally, FIG. 48 shows the state of the network after all messages have been processed, the nodes have initiated internal processing, and the clocks have advanced. It is noted that this network state is essentially that shown in FIG. 28, except that the clock phase is now incremented by one.

Gopinath-Kurshan 2-2

- 22 -

III. PSEUDO-CODE FOR STATE TRANSITIONS
A. TRANSITIONS DUE TO SELF MESSAGES (1) node=FORCED (FIG. 6)
   (a) forced?
5       [1] if clock.#[*,released] and the node has no guards, then do [2],[3],[4]
         else CONTINUE
      [2] set node=SNAPPED
      [3] send snapped? along self
      [4] CONTINUE 10 (2) node=SNAPPED (FIG. 7)
   (a) snapped?
      [1] send message.#[discharge,<I>] along all guards
      [2] set link.[<guards>]=guard.discharge
      [3] set node=DISCHARGED
15       [4] send discharged? along self
      [5] CONTINUE (3) node=DISCHARGED (FIG. 8)
   (a) discharged?
      [1] if the node has no guards, then do [2],[3],[4],[5],[6] else CONTINUE
20       [2] send message.#[charge,<rank>] along captain
      [3] set [node=CHARGED, rank=I, link.[C_Nd(I)]=guard.charge]
      [4] set active phase = P+1
      [5] CONTINUE (It is to be noted that there is no charged? self message.)

Gopinath-Kurshan 2-2

- 23 -

B. TRANSITIONS DUE TO CLOCK MESSAGES (1) clock.#[relaxed,inhibited]
    (a) trigger (FIG. 9)
        [1] set clock.#[triggered,inhibited]
        [2] if [node=CHARGED] then do [3],[4],[5],[6],[7] else CONTINUE
        [3] send message.#[force,<I>] along every C_Nd(I)
        [4] set link.[<C_Nd(I)>]=guard.force
        [5] set [node=FORCED,rank=<I>]
        [6] send forced? along self
        [7] CONTINUE (2) clock.#[*,inhibited]
    (a) release (FIG. 10)
        [1] set clock.#[*,released]
        [2] if [node=FORCED, link.*=guard.snap], then do [3],[4] else CONTINUE
        [3] set node=SNAPPED
        [4] if node has a captain, then do [5],[6],[7] else do [8],[9]
        [5] send message.#[snap,<rank>] along captain
        [6] set link.captain=snap
        [7] CONTINUE
        [8] send snapped? along self
        [9] CONTINUE

C. TRANSITIONS DUE TO SYSTEM MESSAGES (1) node=CHARGED
  (a) link=guard.charge
    (i) message=[force,<C.rank>] (FIG. 11)
      [1] send message.#[force, <C.rank>] along every C_Nd(I) except L
      [2] set [node=FORCED, rank=<C.rank>]
      [3] set link.[<C_Nd(I) except L>]=guard.force
      [4] set link.<L>=captain.force
      [5] send forced? along self
      [6] CONTINUE (2) node=FORCED
  (a) link=captain.force
    [1] CONTINUE (b) link=guard.force
    (i) message=[force,<C.rank>] (FIG. 12)
      [1] if rank<C.rank, then do [2],[3],[4],[5],[6] else [7]
      [2] send message.#[force, <C.rank>] along captain
      [3] set link.<captain>=guard.force
      [4] set link.<L>=captain.force
      [5] set [rank=<C.rank>]
      [6] CONTINUE
      [7] if rank>C.rank, then do [8],[9] else [10]
      [8] send message.#[force, <rank>] along L
      [9] CONTINUE
      [10] if rank=C.rank, then do [11],[12],[13] else CONTINUE
      [11] send message.#[resign, <C.rank>] along L
      [12] set link.<L>=friend.resign
      [13] CONTINUE Gopinath-Kurshan 2-2

- 25 -

(ii) message=snap (FIG. 14)
  [1] set link.<L>=guard.snap
  [2] if link.*=guard.snap, then do [3] else CONTINUE
  [3] if clock.#[*,released], then do [4],[5] else CONTINUE
  [4] set node=SNAPPED
  [5] if node has a captain, then do [6], [7], [8] else do [9], [10]
  [6] send message.#[snap, <rank>] along captain
  [7] set link.captain=snap
  [8] CONTINUE
  [8] set node=SNAPPED
  [9] send snapped? along self
  [10] CONTINUE (iii) message=resign (FIG. 13)
  [1] set link.<L>=friend.resign
  [2] CONTINUE (c) link:guard.snap
 [1] CONTINUE (d) link=friend.resign
 [1] CONTINUE (3) node=SNAPPED
 (a) link=captain.snap
  (i) message=discharge (FIG. 15)
   [1] send message.#[discharge, <C.rank>] along all guards
   [2] set link.<L>=captain.discharge and guard links to guard.discharge
   [3] set node=DISCHARGED
   [4] send discharged? along self
   [5] CONTINUE (b) link=guard.snap
  [1] CONTINUE Gopinath-Kurshan 2-2

- 26 -

(c) link=friend.resign
        [1] CONTINUE (4) node=DISCHARGED
    (a) link=captain.discharge
        [1] CONTINUE (b) link=guard.discharge
      (i) message=charge (FIG. 16)
        [1] if link.*=guard.charge for every guard except L, then do
            [2],[3],[4],[5],[6] else CONTINUE
        [2] send message.#[charge, <rank>] along captain
        [3] set [node=CHARGED, rank=I, link.[C_Nd(I)]=guard.charge]
        [4] set active phase = P+1
        [5] send charged? along self
        [6] CONTINUE (c) link=guard.charge
        [1] CONTINUE (d) link=friend.resign
        [1] CONTINUE By way of reiteration, TABLE I below shows the allowable combinations of node and link states. All nodes start as CHARGED, and then cycle through the FORCED, SNAPPED, and DISCHARGED states. The nodes may cycle synchronously or asynchronously; however, the nodes are never out of lock-step. The link state may be misaligned with the node state because the link state may lag or lead the node state.

TABLE I

| nodes/links | captain | guard | friend |
|---|---|---|---|
| CHARGED |  | charge |  |
| FORCED | force | force | resign |
|  |  | snap |  |
| SNAPPED | snap | snap | resign |
| DISCHARGED | discharge | discharge | resign |
|  |  | charge |  |

In addition, TABLE II shows the possible states and state transitions of a clock in one clock cycle. The transition marked x* is possible only when no data is interlocked between trigger and release; equivalently, no data is transferred. It is further noted that the clock can be in any one of the possible states at the start of a clock cycle.

TABLE II

| | relaxed inhibited | relaxed released | triggered inhibited | triggered released |
|---|---|---|---|---|
| — | r,i | r,r | t,i | t,r |
| r,i | x | x | x |  |
| r,r |  | x |  | x* |
| t,i |  | x |  | x |
| t,r |  |  |  | x |

Distribution of Data After Establishment of the Spanning Tree

Data may be distributed as part of the synchronized cycles described above. Between the trigger and release of any clock, data may be written. Also, with reference to FIG. 48, data may be received along each guard link (reference numeral 4802) whose mode is force, as per reference numeral 4810. All data messages are propagated backward (reference numeral 4820) toward the root of the spanning tree via each node's captain link. Thus, data moves toward the root (or supercaptain (4801)—i.e., the node with no captain link). Once a node becomes SNAPPED, which is equivalent to each link associated with this node having a mode of snap (reference numeral 4830), no further data messages can originate upward from this node or from any links which this node guards, since the clock in this node and all clocks in nodes accessible via guard links are already released. All data messages are accumulated with the supercaptain by the time it becomes SNAPPED. All accumulated data is distributed forward (reference numeral 4840) in the spanning tree toward leaf nodes with the discharge message (reference numeral 4850). Each node receiving a discharge message holds a copy of the data for local read access, and forwards data along each guard link with the discharge message. Nodes ultimately respond with the charge message (reference numeral 4860) to begin a new synchronization cycle. Thus, the network cycles through write-read phases, including a stage wherein reconfiguration of the network occurs in each cycle to determine another spanning tree (possibly a new one or maybe even the last spanning tree).

IV. VHDL Code

The VHDL code commensurate with the flow diagrams set forth in FIGS. 5–16 is set forth in the Appendix.

It is to be understood that the above-described embodiments are simply illustrative of the application of the principles in accordance with the present invention. Other embodiments may be readily devised by those skilled in the art which may embody the principles in spirit and scope. Thus, it is to be further understood that the methodology described herein is not limited to the specific forms shown by way of illustration, but may assume other embodiments limited only by the scope of the appended claims.

APPENDIX (1)

```
use work.lclock_pack.all;
architecture behavior of node is
   signal nstate: node_state;
   signal csig: clock_message;
   signal cstate: clock_state;
   signal node_id: natural;

alias nodestate: n_state is nstate.nodest;
   alias nodephase: natural is nstate.phase;
   alias link1_state: link_state is nstate.links(1);
   alias link2_state: link_state is nstate.links(2);
   alias link3_state: link_state is nstate.links(3);
   alias link4_state: link_state is nstate.links(4);
   alias node_rank: natural is nstate.rank;

constant del: time := 1 ns;

function get_maxrank(phase: natural; l1, l2, l3, l4: sys_message)
   return natural is
   variable temp: natural := 0;
begin
   if(l1.phase = phase and l1.message = force and l1.rank > temp) then
      temp := l1.rank;
   end if;
   if(l2.phase = phase and l2.message = force and l2.rank > temp) then
      temp := l2.rank;
   end if;
   if(l3.phase = phase and l3.message = force and l3.rank > temp) then
      temp := l3.rank;
   end if;
   if(l4.phase = phase and l4.message = force and l4.rank > temp) then
      temp := l4.rank;
   end if;
   return temp;
end get_maxrank;

function guards_snapped(nodest: node_state)
   return logresult is
   variable temp: logresult := true;
begin
   for i in 1 to VAL loop
      if (nodest.links(i).lmode = guard) then
         if (nodest.links(i).lstate /= snap) then
            temp := false;
         end if;
      end if;
   end loop;
   return temp;
end guards_snapped;

function guards_charged(nodest: node_state)
   return logresult is
   variable temp: logresult := true;
begin
   for i in 1 to VAL loop
      if (nodest.links(i).lmode = guard) then
         if (nodest.links(i).lstate /= charge) then
            temp := false;
         end if;
      end if;
   end loop;
   return temp;
end guards_charged;

function super_captain (nodest: node_state)
   return logresult is
```

```
        variable temp: logresult := true;                                    (2)
    begin
        for i in 1 to VAL loop
            if (nodest.links(i).lmode = captain) then
                temp := false;
            end if;
        end loop;
        return temp;
    end super_captain;

begin
    mon_state <= nstate;  -- pass node state to resolution function monitor;
    node_id <= nid;
    process(lin1, lin2, lin3, lin4, csig, cstate, nstate)
        variable temp: logresult;
        variable vnstate: node_state;
    begin
        vnstate := nstate;
        case vnstate.nodest is
            when charged =>
                if(lin1.message = noconnect) then
                    vnstate.links(1).lmode := disconnected;
                end if;
                if(lin2.message = noconnect) then
                    vnstate.links(2).lmode := disconnected;
                end if;
                if(lin3.message = noconnect) then
                    vnstate.links(3).lmode := disconnected;
                end if;
                if(lin4.message = noconnect) then
                    vnstate.links(4).lmode := disconnected;
                end if;

if(csig.message = trigger and csig.phase = vnstate.phase and
                    nid > get_maxrank(vnstate.phase, lin1, lin2, lin3, lin4)) then
                    vnstate.nodest := forced ;
                    vnstate.rank := nid ;
                    lout1 <= (force, csig.phase, nid) after del;
                    lout2 <= (force, csig.phase, nid) after del;
                    lout3 <= (force, csig.phase, nid) after del;
                    lout4 <= (force, csig.phase, nid) after del;

for i in 1 to VAL loop
                        if(vnstate.links(i).lmode /= disconnected) then
                            vnstate.links(i):= (guard, force) ;
                        end if;
                    end loop;

-- lin1 forces
                elsif (lin1.message = force and lin1.phase = vnstate.phase and
                       lin1.rank = get_maxrank(vnstate.phase, lin1, lin2, lin3,
                       lin4)) then
                    vnstate.nodest := forced ;
                    vnstate.rank := lin1.rank ;
                    vnstate.links(1) := (captain, force) ;

if (vnstate.links(2).lmode /= disconnected) then
                        lout2 <= (force, vnstate.phase, lin1.rank) after del;
                        vnstate.links(2) := (guard, force) ;
                    end if;
                    if (vnstate.links(3).lmode /= disconnected) then
                        lout3 <= (force, vnstate.phase, lin1.rank) after del;
                        vnstate.links(3) := (guard, force) ;
```

```
                end if;                                                          (3)
            if (vnstate.links(4).lmode /= disconnected) then
                lout4 <= (force, vnstate.phase, lin1.rank) after del;
                vnstate.links(4) := (guard, force) ;
            end if;

-- lin2 forces
    elsif (lin2.message = force and lin2.phase = vnstate.phase and
           lin2.rank = get_maxrank(vnstate.phase, lin1, lin2, lin3,
           lin4)) then
        vnstate.nodest := forced ;
        vnstate.rank := lin2.rank ;
        vnstate.links(2) := (captain, force) ;

if (vnstate.links(1).lmode /= disconnected) then
            lout1 <= (force, vnstate.phase, lin2.rank) after del;
            vnstate.links(1) := (guard, force) ;
        end if;
        if (vnstate.links(3).lmode /= disconnected) then
            lout3 <= (force, vnstate.phase, lin2.rank) after del;
            vnstate.links(3) := (guard, force) ;
        end if;
        if (vnstate.links(4).lmode /= disconnected) then
            lout4 <= (force, vnstate.phase, lin2.rank) after del;
            vnstate.links(4) := (guard, force) ;
        end if;

-- lin3 forces
    elsif (lin3.message = force and lin3.phase = vnstate.phase and
           lin3.rank = get_maxrank(vnstate.phase, lin1, lin2, lin3,
           lin4)) then
        vnstate.nodest := forced ;
        vnstate.rank := lin3.rank ;
        vnstate.links(3) := (captain, force) ;

if (vnstate.links(1).lmode /= disconnected) then
            lout1 <= (force, vnstate.phase, lin3.rank) after del;
            vnstate.links(1) := (guard, force) ;
        end if;
        if (vnstate.links(2).lmode /= disconnected) then
            lout2 <= (force, vnstate.phase, lin3.rank) after del;
            vnstate.links(2) := (guard, force) ;
        end if;
        if (vnstate.links(4).lmode /= disconnected) then
            lout4 <= (force, vnstate.phase, lin3.rank) after del;
            vnstate.links(4) := (guard, force) ;
        end if;

-- lin4 forces
    elsif (lin4.message = force and lin4.phase = vnstate.phase and
           lin4.rank = get_maxrank(vnstate.phase, lin1, lin2, lin3,
           lin4)) then
        vnstate.nodest := forced ;
        vnstate.rank := lin4.rank ;
        vnstate.links(4) := (captain, force) ;

if (vnstate.links(1).lmode /= disconnected) then
            lout1 <= (force, vnstate.phase, lin4.rank) after del;
            vnstate.links(1) := (guard, force) ;
        end if;
        if (vnstate.links(2).lmode /= disconnected) then
            lout2 <= (force, vnstate.phase, lin4.rank) after del;
            vnstate.links(2) := (guard, force) ;
        end if;
        if (vnstate.links(3).lmode /= disconnected) then
```

(4)
```
            lout3 <= (force, vnstate.phase, lin4.rank) after del;
            vnstate.links(3) := (guard, force) ;
        end if;

end if;
when forced =>
    temp := guards_snapped(vnstate);
    if (temp = true and cstate.inh = released
        and cstate.phase = vnstate.phase) then
        vnstate.nodest := snapped ;
        if (vnstate.links(1).lmode = captain) then
            vnstate.links(1).lstate := snap ;
            lout1 <= (snap, vnstate.phase, 0) after del;
        elsif (vnstate.links(2).lmode = captain) then
            vnstate.links(2).lstate := snap ;
            lout2 <= (snap, vnstate.phase, 0) after del;
        elsif (vnstate.links(3).lmode = captain) then
            vnstate.links(3).lstate := snap ;
            lout3 <= (snap, vnstate.phase, 0) after del;
        elsif (vnstate.links(4).lmode = captain) then
            vnstate.links(4).lstate := snap ;
            lout4 <= (snap, vnstate.phase, 0) after del;
        end if;
    end if;

-- start  of the link1 part for the forced state if (lin1'event and vnstate.links(1) = (guard, force)) then
        case lin1.message is
            when snap =>
                vnstate.links(1).lstate := snap ;
            when force =>
                if (lin1.rank > vnstate.rank ) then
                    vnstate.links(1) := (captain, force) ;
                    vnstate.rank := lin1.rank ;
                    if (vnstate.links(2).lmode = captain) then
                        vnstate.links(2) := (guard, force) ;
                        lout2 <= (force, vnstate.phase, lin1.rank)
                                 after del;
                    end if;
                    if (vnstate.links(3).lmode = captain) then
                        vnstate.links(3) := (guard, force) ;
                        lout3 <= (force, vnstate.phase, lin1.rank)
                                 after del;
                    end if;
                    if (vnstate.links(4).lmode = captain) then
                        vnstate.links(4) := (guard, force) ;
                        lout4 <= (force, vnstate.phase, lin1.rank)
                                 after del;
                    end if;
                elsif (lin1.rank = vnstate.rank) then
                    vnstate.links(1) := (friend, resign) ;
                    lout1 <= (resign, vnstate.phase, vnstate.rank)
                             after del;
                elsif (lin1.rank < vnstate.rank) then
                    lout1 <= (force, vnstate.phase, vnstate.rank)
                             after del;
                end if;
            when resign =>
                vnstate.links(1) := (friend, resign) ;
            when others =>
                null;
        end case;
    end if;
    -- end of the link1 part for the forced state
```

(5)

```
-- start of the link2 part for the forced state if (lin2'event and vnstate.links(2) = (guard, force)) then
   case lin2.message is
      when snap =>
         vnstate.links(2).lstate := snap ;
      when force =>
         if (lin2.rank > vnstate.rank) then
            vnstate.links(2) := (captain, force) ;
            vnstate.rank := lin2.rank ;
            if (vnstate.links(1).lmode = captain) then
               vnstate.links(1) := (guard, force) ;
               lout1 <= (force, vnstate.phase, lin2.rank)
                     after del;
            end if;
            if (vnstate.links(3).lmode = captain) then
               vnstate.links(3) := (guard, force) ;
               lout3 <= (force, vnstate.phase, lin2.rank)
                     after del;
            end if;
            if (vnstate.links(4).lmode = captain) then
               vnstate.links(4) := (guard, force) ;
               lout4 <= (force, vnstate.phase, lin2.rank)
                     after del;
            end if;
         elsif (lin2.rank = vnstate.rank) then
            vnstate.links(2) := (friend, resign) ;
            lout2 <= (resign, vnstate.phase, vnstate.rank)
                     after del;
         elsif (lin2.rank < vnstate.rank) then
            lout2 <= (force, vnstate.phase, vnstate.rank)
                     after del;
         end if;
      when resign =>
            vnstate.links(2) := (friend, resign) ;
      when others =>
            null;
   end case;
end if;
-- end of the link2 part for the forced state -- start of the link3 part for the forced state if (lin3'event and vnstate.links(3) = (guard, force)) then
   case lin3.message is
      when snap =>
         vnstate.links(3).lstate := snap ;
      when force =>
         if (lin3.rank > vnstate.rank) then
            vnstate.links(3) := (captain, force) ;
            vnstate.rank := lin3.rank ;
            if (vnstate.links(2).lmode = captain) then
               vnstate.links(2) := (guard, force) ;
               lout2 <= (force, vnstate.phase, lin3.rank)
                     after del;
            end if;
            if (vnstate.links(1).lmode = captain) then
               vnstate.links(1) := (guard, force) ;
               lout1 <= (force, vnstate.phase, lin3.rank)
                     after del;
            end if;
            if (vnstate.links(4).lmode = captain) then
               vnstate.links(4) := (guard, force) ;
               lout4 <= (force, vnstate.phase, lin3.rank)
```

```
                                      after del;
                       end if;
                   elsif (lin3.rank = vnstate.rank) then
                       vnstate.links(3) := (friend, resign) ;
                       lout3 <= (resign, vnstate.phase, vnstate.rank)
                                 after del;
                   elsif (lin3.rank < vnstate.rank) then
                       lout3 <= (force, vnstate.phase, vnstate.rank)
                                 after del;
                   end if;
               when resign =>
                      vnstate.links(3) := (friend, resign) ;
               when others =>
                      null;
           end case;
       end if;
       -- end of the link3 part for the forced state -- start  of the link4 part for the forced state if (lin4'event and vnstate.links(4) = (guard, force)) then
           case lin4.message is
               when snap =>
                   vnstate.links(4).lstate := snap ;
               when force =>
                   if (lin4.rank > vnstate.rank) then
                       vnstate.links(4) := (captain, force) ;
                       vnstate.rank := lin4.rank ;
                       if (vnstate.links(2).lmode = captain) then
                          vnstate.links(2) := (guard, force) ;
                          lout2 <= (force, vnstate.phase, lin4.rank)
                                    after del;
                       end if;
                       if (vnstate.links(3).lmode = captain) then
                          vnstate.links(3) := (guard, force) ;
                          lout3 <= (force, vnstate.phase, lin4.rank)
                                    after del;
                       end if;
                       if (vnstate.links(1).lmode = captain) then
                          vnstate.links(1) := (guard, force) ;
                          lout1 <= (force, vnstate.phase, lin4.rank)
                                    after del;
                       end if;
                   elsif (lin4.rank = vnstate.rank) then
                       vnstate.links(4) := (friend, resign) ;
                       lout4 <= (resign, vnstate.phase, vnstate.rank)
                                 after del;
                   elsif (lin4.rank < vnstate.rank) then
                       lout4 <= (force, vnstate.phase, vnstate.rank)
                                 after del;
                   end if;
               when resign =>
                      vnstate.links(4) := (friend, resign) ;
               when others =>
                      null;
           end case;
       end if;
       -- end of the link4 part for the forced state when snapped => temp := super_captain(vnstate);
       if (temp = true) then
           if (vnstate.links(1).lmode = guard) then
              vnstate.links(1).lstate := discharge ;
```

(6)

(7)

```
              lout1 <= (discharge, vnstate.phase, 0) after del;
           end if;
           if (vnstate.links(2).lmode = guard) then
              vnstate.links(2).lstate := discharge ;
              lout2 <= (discharge, vnstate.phase, 0) after del;
           end if;
           if (vnstate.links(3).lmode = guard) then
              vnstate.links(3).lstate := discharge ;
              lout3 <= (discharge, vnstate.phase, 0) after del;
           end if;
           if (vnstate.links(4).lmode = guard) then
              vnstate.links(4).lstate := discharge ;
              lout4 <= (discharge, vnstate.phase, 0) after del;
           end if;
           vnstate.nodest := discharged ;
        end if;

if ((vnstate.links(1) = (captain, snap) and
             lin1.message = discharge) or
            (vnstate.links(2) = (captain, snap) and
             lin2.message = discharge) or
            (vnstate.links(3) = (captain, snap) and
             lin3.message = discharge) or
            (vnstate.links(4) = (captain, snap) and
             lin4.message = discharge)) then
           vnstate.nodest := discharged ;
           if (vnstate.links(1).lmode = guard) then
              vnstate.links(1).lstate := discharge ;
              lout1 <= (discharge, vnstate.phase, 0) after del;
           elsif (vnstate.links(1).lmode = captain) then
              vnstate.links(1).lstate := discharge ;
           end if;
           if (vnstate.links(2).lmode = guard) then
              lout2 <= (discharge, vnstate.phase, 0) after del;
           elsif (vnstate.links(2).lmode = captain) then
              vnstate.links(2).lstate := discharge ;
           end if;
           if (vnstate.links(3).lmode = guard) then
              vnstate.links(3).lstate := discharge ;
              lout3 <= (discharge, vnstate.phase, 0) after del;
           elsif (vnstate.links(3).lmode = captain) then
              vnstate.links(3).lstate := discharge ;
           end if;
           if (vnstate.links(4).lmode = guard) then
              vnstate.links(4).lstate := discharge ;
              lout4 <= (discharge, vnstate.phase, 0) after del;
           elsif (vnstate.links(4).lmode = captain) then
              vnstate.links(4).lstate := discharge ;
           end if;
        end if;
     when discharged =>
        if (lin1.message = charge and vnstate.links(1) = (guard, discharge))
           then
           vnstate.links(1) := (guard, charge) ;
        end if;
        if (lin2.message = charge and vnstate.links(2) = (guard, discharge))
           then
           vnstate.links(2) := (guard, charge) ;
        end if;
        if (lin3.message = charge and vnstate.links(3) = (guard, discharge))
           then
           vnstate.links(3) := (guard, charge) ;
        end if;
        if (lin4.message = charge and vnstate.links(4) = (guard, discharge))
           then
           vnstate.links(4) := (guard, charge) ;
```

(8)

```
                end if;
                if (guards_charged(vnstate) = true) then
                    if (vnstate.links(1).lmode = captain) then
                        lout1 <= (charge, vnstate.phase, 0) after del;
                    elsif (vnstate.links(2).lmode = captain) then
                        lout2 <= (charge, vnstate.phase, 0) after del;
                    elsif (vnstate.links(3).lmode = captain) then
                        lout3 <= (charge, vnstate.phase, 0) after del;
                    elsif (vnstate.links(4).lmode = captain) then
                        lout4 <= (charge, vnstate.phase, 0) after del;
                    end if;
                    for i in 1 to VAL loop
                        if (vnstate.links(i).lmode /= disconnected) then
                            vnstate.links(i) := (guard, charge) ;
                        end if;
                    end loop;
                    vnstate.phase := vnstate.phase + 1 ;
                    vnstate.rank := nid ;
                    vnstate.nodest := charged ;
                    cstate.phase <= cstate.phase + 1 after del;
                    cstate.inh <= inhibited after del;
                    cstate.trig <= relaxed after del;
                    csig.phase <= csig.phase + 1 after del; -- temporary
                end if;
            end case;

if (csig'event) then
            case csig.message is
                when relax =>
                    cstate.trig <= relaxed after del;
                when trigger =>
                    cstate.trig <= triggered after del;
                when inhibit =>
                    cstate.inh <= inhibited after del;
                when release =>
                    cstate.inh <= released after del;
            end case;
        end if;

nstate <= vnstate after del;
    end process;
end behavior;

use work.lclock_pack.all;
architecture behavior of link is
begin
    lout1 <= transport lin2 after lin_del;
    lout2 <= transport lin1 after lin_del;
end behavior;

use work.lclock_pack.all;
architecture behavior of dummy is
begin
    lout <= (noconnect, 0, 0);
end behavior;
```

(9)

```
use work.lclock_pack.all;
entity node is
   generic (nid: natural;
            inh_per, trig_per: time);
   port (lin1, lin2, lin3, lin4: in sys_message;
         lout1, lout2, lout3, lout4: out sys_message);
end node;

use work.lclock_pack.all;
entity link is
   generic (lin_del: time := 5 ns);
   port(lout1, lout2: out sys_message;
        lin1, lin2: in sys_message);
end link;

use work.lclock_pack.all;
entity dummy is
   port(lin: in sys_message;
        lout: out sys_message);
end dummy;
```

(10)

```
package lclock_pack is
   constant Q: integer := 256;
   constant VAL: integer := 4;
--    subtype natural is integer range 0 to +2147483647;
   type logresult is (false, true);
   type clk_force is (relaxed, triggered);
   type clk_free is (inhibited, released);

type clock_state is
      record
         phase: natural;
         trig: clk_force;
         inh: clk_free;
      end record;

type l_mode is (guard, captain, friend, disconnected);
   type l_state is (charge, force, resign, snap, discharge, noconnect);
   type link_state is
      record
         lmode: l_mode;
         lstate: l_state;
      end record;
   type links_state is array (1 to VAL) of link_state;

type n_state is (charged, forced, snapped, discharged);
   type node_state is
      record
         phase: natural;
         nodest: n_state;
         rank: natural;
         links: links_state;
      end record;

type sys_message is
      record
         message: l_state;
         phase: natural;
         rank: natural;
      end record;

type c_message is (relax, trigger, inhibit, release);
   type clock_message is
      record
         message: c_message;
         phase: natural;
      end record;

type node_state_vector is array (natural range <>) of node_state;

function nstate_monitor (nsvect: node_state_vector)
      return node_state;

signal mon_state: nstate_monitor node_state;

end lclock_pack;
package body lclock_pack is
   function nstate_monitor (nsvect: node_state_vector)
      return node_state is variable result: node_state;
      variable temp, min_phase, max_phase, num_capt: natural;

begin
      min_phase := nsvect(0).phase;
      max_phase := min_phase;
```

(11)

```
            result.nodest := snapped;
         for i in nsvect'range loop
            if (nsvect(i).phase < min_phase) then
               min_phase := nsvect(i).phase;
            elsif (nsvect(i).phase > max_phase) then
               max_phase := nsvect(i).phase;
            end if;

temp := 0;
            if (nsvect(i).nodest = snapped) then
               for j in 1 to VAL loop
                  if (nsvect(i).links(j).lmode = captain) then
                     temp := temp + 1;
                  end if;
               end loop;
               assert (temp <= 1)
                  report "multiple captains at the node"
                  severity error;
               if (temp = 0) then -- no captains at the node
                  num_capt := num_capt + 1;
               end if;
            end if;
            if (nsvect(i).nodest /= snapped) then
               result.nodest := nsvect(i).nodest;
            end if;
         end loop;
         assert(max_phase - min_phase <= 1)
            report "difference between node phases is grater then 1"
            severity error;
         if ((num_capt = 1 and result.nodest /= snapped) or (num_capt > 1)) then
            assert (false)
               report "more then one super captain"
               severity error;
         end if;
         return result;
      end nstate_monitor;
end lclock_pack;
```

What is claimed is:

1. A method for establishing a scalable spanning tree for an arbitrary subset of nodes and links in a network in which the total resources at each node are independent of the size of the network, and for propagating data over the spanning tree, the method comprising the steps of selecting a set of states for each node and each link in the network, the states being independent of the topology of the network, of the size of the network, and of the node itself, selecting a set of messages exchanged between neighboring nodes over the links, the messages being independent of the topology of the network, of the size of the network, and of the node itself, determining a set of state transition rules for the state of each node and of each link to coordinate the sending and receiving of the messages to the neighboring nodes for setting up the spanning tree, the state transition rules being independent of the topology of the network, of the size of the network, and of the node itself, determining a completion rule in order that at least one node detects the formation of the spanning tree, this node being designated the root node, the rule being independent of the topology of the network, of the size of the network, and of the node itself, back-propagating node data from each node in a subset of nodes to the root node over the spanning tree to form composite data, and forward-propagating at least part of the composite data as said data from the root node to another subset of the nodes.

2. The method as recited in claim 1 wherein said set of messages further includes self messages sent to corresponding nodes.

3. A method for establishing a scalable spanning tree for an arbitrary subset of nodes and links in a network in which the total resources at each node are independent of the size of the network, and for propagating data over the spanning tree, the method comprising the steps of processing a set of states for each node and each link in the network, the states being independent of the topology of the network, of the size of the network, and of the node itself, processing a set of messages exchanged between neighboring nodes over the links, the messages being independent of the topology of the network, of the size of the network, and of the node itself, processing a set of state transition rules for the state of each node and of each link to coordinate the sending and receiving of the messages to the neighboring nodes for setting up the spanning tree, the state transition rules being independent of the topology of the network, of the size of the network, and of the node itself, processing a completion rule in order that at least one node detects the formation of the spanning tree, this node being designated the root node, the rule being independent of the topology of the network, of the size of the network, and of the node itself, back-propagating node data from each node in a subset of nodes to the root node over the spanning tree to form composite data, and forward-propagating at least part of the composite data as said data from the root node to another subset of the nodes.

4. The method as recited in claim 3 wherein said set of messages further includes self messages sent to corresponding nodes.

5. A method for coordinating programs executing in the nodes of a spanning tree covering a network composed of the nodes and links interconnecting the nodes, and for propagating data over the spanning tree, the method comprising the steps of determining the states of each node for which data may be collected and sent to the root of the spanning tree, determining the states of each node for which data may be distributed away from the root of the spanning tree, wherein the states are independent of the topology of the network, of the size of the network, and of each node itself, and selecting messages to indicate the completion of a cycle involving the collection of data at the root and the distribution of data to each node from the root, the messages being independent of the topology of the network, of the size of the network, and of each node itself.

6. A method for coordinating programs executing in the nodes of a spanning tree covering a network composed of the nodes and links interconnecting the nodes, and for propagating data over the spanning tree, the method comprising the steps of processing the states of each node for which data may be collected and sent to the root of the spanning tree, processing the states of each node for which data may be distributed away from the root of the spanning tree, wherein the states are independent of the topology of the network, of the size of the network, and of each node itself, and processing messages to indicate the completion of a cycle involving the collection of data at the root and the distribution of data to each node from the root, the messages being independent of the topology of the network, of the size of the network, and of each node itself.

7. A method for propagating data in a network composed of nodes interconnected by links in which the total resources at each node are independent of the topology of the network, of the size of the network, and of the node itself, the method comprising the steps of determining a scalable spanning tree over the nodes of the network, the step of determining including the steps of processing a set of states for each node and each link, the states being independent of the topology of the network, of the size of the network, and of the node itself, processing a set of messages exchanged between neighboring nodes over the links, the messages being independent of the topology of the network, of the size of the network, and of the node itself, processing a set of state transition rules for the state of each node and of each link to coordinate the sending and receiving of the messages to the neighboring nodes for setting up the spanning tree, the state transition rules being independent of the topology of the network, of the size of the network, and of the node itself, and processing a completion rule in order that at least one node detects the formation of the spanning tree, this node being designated the root node, the rule being independent of the topology of the network, of the size of the network, and of the node itself, back-propagating node data from each node in a subset of the nodes to the root node over the spanning tree to form composite data, and forward-propagating at least part of the composite data from the root node to another subset of the nodes.

8. A method for establishing a scalable spanning tree for an arbitrary subset of nodes and links in a network in which the total resources at each node is independent of the size of the network, the spanning tree being used to propagate data originated by the nodes over the network, the method comprising the steps of selecting a set of node states for each node, the node states being independent of the topology of the network, of the size of the network, and of the node itself, selecting a set of link states for each link, the link states being independent of the topology of the network, of the size of the network, and of the node itself, selecting a set of self messages originated in each of the nodes for self-communication, the self messages being independent of the topology of the network, of the size of the network, and of the node itself, selecting a set of synchronization messages originated in one or more of the subset of nodes to control the exchange of the data over the links, the synchronization messages being independent of the topology of the network, of the size of the network, and of the node itself, selecting a set of system messages originated in the subset of nodes, the system messages being independent of the topology of the network, of the size of the network, and of the node itself, and wherein each of the system messages may include a subset of the data, transmitting the system messages to neighboring nodes over the links, executing the messages in each node in the order: self messages; synchronization messages; and system messages, determining a set of state transition rules for the state of each node and the state of each link to coordinate the sending and receiving of the system messages to the neighboring nodes for setting up the spanning tree, the state transition rules being independent of the topology of the network, of the size of the network, and of the node itself, and determining a completion rule in order that at least one node detects the formation of the spanning tree, the rule being independent of the topology of the network, of the size of the network, and of the node itself.

* * * * *